US011751126B2

(12) United States Patent
Ananda et al.

(10) Patent No.: US 11,751,126 B2
(45) Date of Patent: Sep. 5, 2023

(54) BATCH-WISE FREQUENCY SCANNING

(71) Applicant: QUALCOMM Incorporated, San Diego, CA (US)

(72) Inventors: Raghavendra Shyam Ananda, Hyderabad (IN); Ganesh Nagamani, Hyderabad (IN); Srikanth Menon, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 17/100,443

(22) Filed: Nov. 20, 2020

(65) Prior Publication Data

US 2022/0167251 A1 May 26, 2022

(51) Int. Cl.
*H04W 48/16* (2009.01)
*H04L 5/00* (2006.01)
*H04W 72/0453* (2023.01)

(52) U.S. Cl.
CPC ........... *H04W 48/16* (2013.01); *H04L 5/0023* (2013.01); *H04L 5/0053* (2013.01); *H04W 72/0453* (2013.01)

(58) Field of Classification Search
CPC .............. H04J 11/0073; H04L 27/2668; H04L 27/2675; H04W 48/16; H04W 56/0015; H04W 56/0035
See application file for complete search history.

(56) References Cited

U.S. PATENT DOCUMENTS

| 5,666,355 A | 9/1997 | Huah et al. |
| 8,346,251 B2 | 1/2013 | Aiouaz et al. |
| 2017/0034753 A1* | 2/2017 | Yang ..................... H04W 36/14 |

FOREIGN PATENT DOCUMENTS

| EP | 2117128 A1 | 11/2009 |
| WO | WO-2018130311 A1 * | 7/2018 .......... H04J 11/0073 |

OTHER PUBLICATIONS

International Search Report and Written Opinion—PCT/US2021/059943—ISA/EPO—dated Mar. 10, 2022 (204809WO).

* cited by examiner

*Primary Examiner* — Charles C Jiang
*Assistant Examiner* — Debebe A Asefa
(74) *Attorney, Agent, or Firm* — Holland & Hart LLP

(57) ABSTRACT

Methods, systems, and devices for wireless communications are described. A user equipment (UE) may identify that the UE is to scan one or more frequency bands during a cell acquisition procedure. The UE may receive one or more over-the-air signals, each of the one or more over-the-air signals having a respective bandwidth that includes a corresponding plurality of channels from a frequency band of the one or more frequency bands. The UE may process individual ones of the one or more over-the-air signals. The UE may evaluate, in corresponding batches for each of the individual ones of the one or more over-the-air signals, each of the corresponding pluralities of channels for cell acquisition. The UE may acquire a cell via batch-wise evaluation of the corresponding pluralities of channels.

27 Claims, 11 Drawing Sheets

BATCH-WISE FREQUENCY SCANNING

FIELD OF TECHNOLOGY

The following relates to wireless communications, including batch-wise frequency scanning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support batch-wise frequency scanning. Generally, the described techniques provide for scanning and detection by a narrowband user equipment (UE) to be performed on a batch-wise basis. In particular, rather than the UE scanning a single channel at a time, multiple channels may be scanned by the UE at the same time and then processed offline to reduce the total scanning time. To do this, the UE may scan a wideband signal (one that encompasses several narrowband channels). The UE may obtain the wideband signal and store the signals (e.g., individual subcarriers within the channel) in a buffer (for example, buffer A). The UE may then process the signal in buffer A while the UE retunes its RF components to acquire a different wideband signal (one that encompasses several different narrowband channels). Thus, while the UE is processing the channels obtained through the first signal, the UE is also obtaining a second signal (to be stored in, for example, buffer B). Evaluation of the different channels within an obtained signal occurs in parallel—batch-wise. Thus, the width of the obtained signal may correspond to K channels, where K is the maximum number of channels that the UE may process in parallel. While processing, the RF components may be turned off if the processing takes longer than the time it takes the UE to obtain the signals, thus saving power. Each channel may correspond to an evolved Universal Mobile Telecommunications System (UMTS) Terrestrial Radio Access (E-UTRA) Absolute Radio Frequency Channel Number (eARFCN).

A method for wireless communication at a UE is described. The method may include identifying that the UE is to scan one or more frequency bands during a cell acquisition procedure, receiving one or more over-the-air signals, each of the one or more over-the-air signals having a respective bandwidth that includes a corresponding set of multiple channels from a frequency band of the one or more frequency bands, processing individual ones of the one or more over-the air signals, evaluating, in corresponding batches for each of the individual ones of the one or more over-the-air signals, each of the corresponding pluralities of channels for cell acquisition, and acquiring a cell via batch-wise evaluation of the corresponding pluralities of channels.

An apparatus for wireless communication at a UE is described. The apparatus may include a processor, memory in electronic communication with the processor, and instructions stored in the memory. The instructions may be executable by the processor to cause the apparatus to identify that the UE is to scan one or more frequency bands during a cell acquisition procedure, receive one or more over-the-air signals, each of the one or more over-the-air signals having a respective bandwidth that includes a corresponding set of multiple channels from a frequency band of the one or more frequency bands, process individual ones of the one or more over-the air signals, evaluate, in corresponding batches for each of the individual ones of the one or more over-the-air signals, each of the corresponding pluralities of channels for cell acquisition, and acquire a cell via batch-wise evaluation of the corresponding pluralities of channels.

Another apparatus for wireless communication at a UE is described. The apparatus may include means for identifying that the UE is to scan one or more frequency bands during a cell acquisition procedure, means for receiving one or more over-the-air signals, each of the one or more over-the-air signals having a respective bandwidth that includes a corresponding set of multiple channels from a frequency band of the one or more frequency bands, means for processing individual ones of the one or more over-the air signals, means for evaluating, in corresponding batches for each of the individual ones of the one or more over-the-air signals, each of the corresponding pluralities of channels for cell acquisition, and means for acquiring a cell via batch-wise evaluation of the corresponding pluralities of channels.

A non-transitory computer-readable medium storing code for wireless communication at a UE is described. The code may include instructions executable by a processor to identify that the UE is to scan one or more frequency bands during a cell acquisition procedure, receive one or more over-the-air signals, each of the one or more over-the-air signals having a respective bandwidth that includes a corresponding set of multiple channels from a frequency band of the one or more frequency bands, process individual ones of the one or more over-the air signals, evaluate, in corresponding batches for each of the individual ones of the one or more over-the-air signals, each of the corresponding pluralities of channels for cell acquisition, and acquire a cell via batch-wise evaluation of the corresponding pluralities of channels.

In some examples of the method, apparatuses, and non-transitory computer-readable medium described herein, receiving the one or more over-the-air signals may include operations, features, means, or instructions for storing consecutively-received ones of the one or more over-the-air signals in different buffers for processing and evaluating.

In some examples of the method, apparatuses, and non-transitory computer-readable medium described herein, processing the individual ones of the one or more over-the-air signals may include operations, features, means, or instructions for processing a first over-the-air signal of the one or more over-the-air signals while receiving a second over-the-air signal of the one or more over-the-air signals.

Some examples of the method, apparatuses, and non-transitory computer-readable medium described herein may further include operations, features, means, or instructions for reducing power to radio frequency components of the UE during at least a portion of the processing of the individual ones of the one or more over-the-air signals.

In some examples of the method, apparatuses, and non-transitory computer-readable medium described herein, evaluating each of the corresponding pluralities of channels for cell acquisition may include operations, features, means, or instructions for evaluating, as a batch, each of the corresponding pluralities of channels in parallel.

In some examples of the method, apparatuses, and non-transitory computer-readable medium described herein, evaluating each of the corresponding pluralities of channels for cell acquisition may include operations, features, means, or instructions for scanning for a narrowband primary synchronization signal in each of the corresponding pluralities of channels.

Some examples of the method, apparatuses, and non-transitory computer-readable medium described herein may further include operations, features, means, or instructions for completing a full frequency scan of each of the one or more frequency bands during the cell acquisition procedure.

Some examples of the method, apparatuses, and non-transitory computer-readable medium described herein may further include operations, features, means, or instructions for terminating the cell acquisition procedure without completing a full frequency scan of each of the one or more frequency bands based on a successful detection of a cell during the evaluating.

In some examples of the method, apparatuses, and non-transitory computer-readable medium described herein, evaluating each of the corresponding pluralities of channels for cell acquisition may include operations, features, means, or instructions for evaluating individual EARFCNs within a single over-the-air signal of the one or more over-the-air signals.

In some examples of the method, apparatuses, and non-transitory computer-readable medium described herein, the UE may be a narrow-band Internet-of-Things (IoT) device.

DETAILED DESCRIPTION

Cell acquisition by a narrowband Internet of Things user equipment (NB-IoT UE) typically involves the user equipment (UE) scanning a range of frequencies to identify channels in which narrowband communications are supported. A channel in which narrowband communications are supported may include a narrowband (NB) synchronization signal (such as a NB primary synchronization signal (PSS)). If a UE is able to find and receive a NB PSS on a channel, the UE may conclude that the channel supports NB communications and therefore establish a connection with the corresponding base station. However, the process of scanning a channel and detecting a NB PSS on the channel takes time, both in the scanning of the channel, the processing of a signal detected on the channel, and in the retuning of the UE radio frequency (RF) components in order to prepare for scanning another channel. As the number of channels available to scan on each band continues to increase, a NB UE could take over thirty minutes to complete a full frequency scan. Accordingly, ways to improve the efficiency (e.g., reduce time and power consumption) of the scanning process to support cell acquisition are desirable.

Aspects of the disclosure are initially described in the context of wireless communications systems. Generally, the described techniques provide for scanning and detection by a NB UE to be performed on a batch-wise basis. In particular, rather than the UE scanning a single channel at a time, multiple channels may be scanned by the UE at the same time and then processed offline to reduce the total scanning time. To do this, the UE may scan a wideband signal (one that encompasses several narrowband channels). The UE may obtain the wideband signal and store the signals (e.g., individual subcarriers within the channel) in a buffer (for example, buffer A). The UE may then process the signal in buffer A while the UE retunes its RF components to acquire a different wideband signal (one that encompasses several different narrowband channels). Thus, while the UE is processing the channels obtained through the first signal, the UE is also obtaining a second signal (to be stored in, for example, buffer B). Evaluation of the different channels within an obtained signal occurs in parallel—batch-wise. Thus, the width of the obtained signal may correspond to K channels, where K is the maximum number of channels that the UE may process in parallel. While processing, the RF components may be turned off if the processing takes longer than the time it takes the UE to obtain the signals, thus saving power. Each channel may correspond to an evolved Universal Mobile Telecommunications System (UMTS) Terrestrial Radio Access (E-UTRA) Absolute Radio Frequency Channel Number (eARFCN).

Aspects of the disclosure are further illustrated by and described with reference to apparatus diagrams, system diagrams, and flowcharts that relate to batch-wise frequency scanning.

Figure 1:
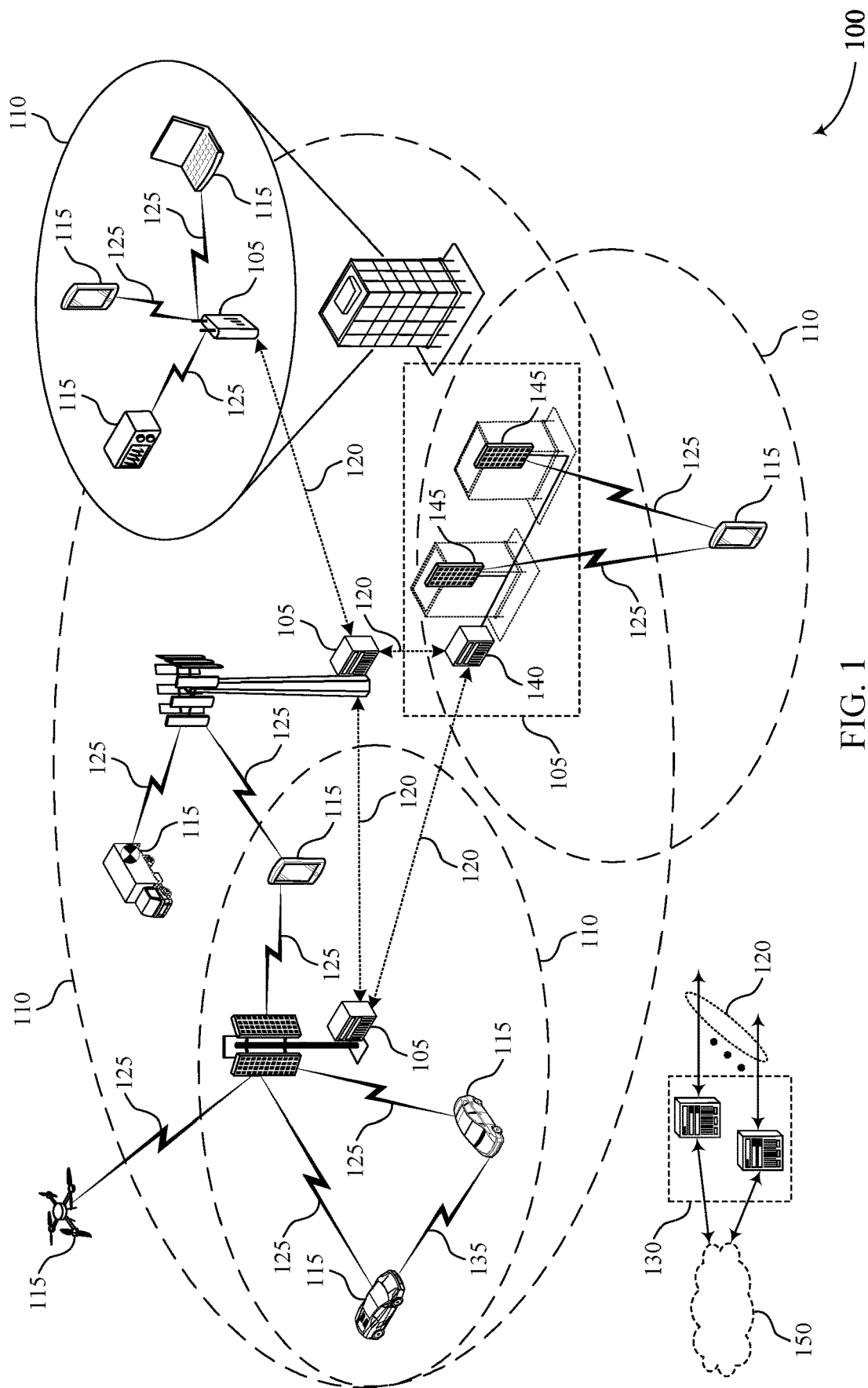
FIG. 1 illustrates an example of a wireless communications system that supports batch-wise frequency scanning in accordance with aspects of the present disclosure.

FIG. 1 illustrates an example of a wireless communications system 100 that supports batch-wise frequency scanning in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an eARFCN) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may identify that the UE 115 is to scan one or more frequency bands during a cell acquisition procedure. The UE 115 may receive one or more over-the-air signals, each of the one or more over-the-air signals having a respective bandwidth that includes a corresponding plurality of channels (e.g., eARFCN(s)) from a frequency band of the one or more frequency bands. The UE 115 may process individual ones of the one or more over-the-air signals. The UE 115 may evaluate, in corresponding batches for each of the individual ones of the one or more over-the-air signals, each of the corresponding pluralities of channels for cell acquisition. The UE 115 may acquire a cell via batch-wise evaluation of the corresponding pluralities of channels.

Figure 2:
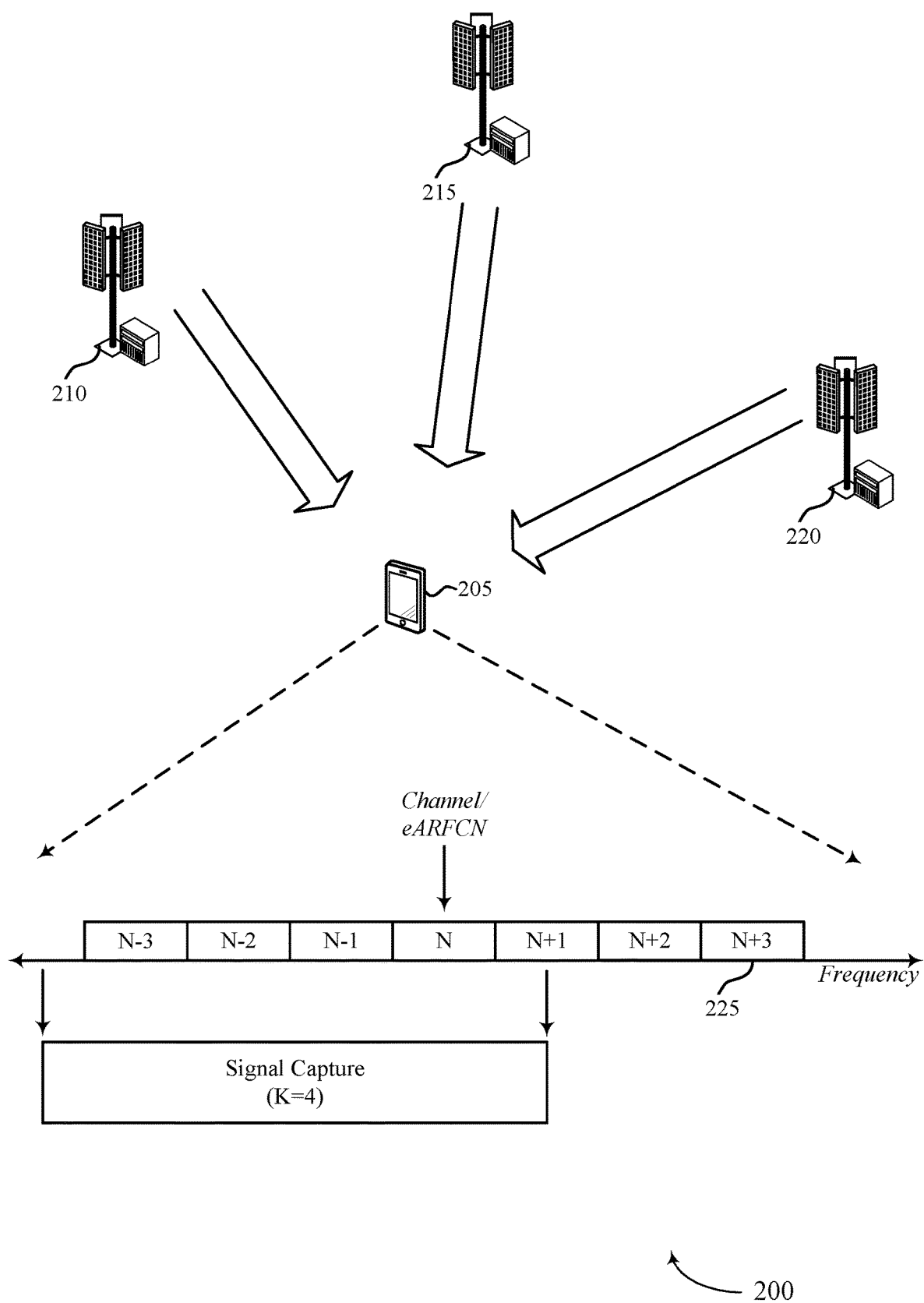
FIG. 2 illustrates an example of a wireless communication system that supports batch-wise frequency scanning in accordance with aspects of the present disclosure.

FIG. 2 illustrates an example of a wireless communication system 200 that supports batch-wise frequency scanning in accordance with aspects of the present disclosure. Wireless communication system 200 may implement aspects of wireless communication system 100. Wireless communication system 200 may include UE 205, base station 210, base station 215, and/or base station 220, which may be examples of the corresponding devices described herein. In some aspects, UE 205 may be an example of a NB-IoT UE, although the described techniques are not limited to NB IoT communications.

UE 205 may perform a cell acquisition procedure (e.g., upon initial power up, cell service being activated/reactivated, etc.) by scanning for signals (e.g., synchronization signals, reference signals, tracking signals, system information signals, etc.) in one or more frequency bands. Generally, the frequency bands may correspond to a collection of over the air signals having a corresponding bandwidth. In some aspects, the over the air signals may have a bandwidth including a corresponding plurality of channels 225 (e.g., eARFCN(s)) from the respective frequency band. For example, UE 205 may typically detect the presence of a cell (e.g., base station 210, base station 215, and/or base station 220) by scanning for signals from each cell. For example, UE 205 may be configured with a maximum coupling loss (MCL) threshold of 164 dB (e.g., the signal-to-noise (SNR) lower than −10 dB) in which UE 205 may use to determine whether a cell is available to establish a connection with (e.g., is a suitable candidate base station. In some aspects, local oscillator(s) implemented at UE 25 may sometimes have a higher initial frequency error rate (e.g., tens of parts-per-million (ppm)), which may initially impact scanning operations. For example, UE 205 may use an auto correlation based method to detect the synchronization signal (e.g., a narrowband PSSs) during the cell acquisition procedure.

In some aspects, the number of channels (e.g., eARFCN(s)) that UE 205 is to scan to identify a subset of supported bands may depend on the frequency band(s) being scanned. In some wireless communication systems, UE 205 may perform the cell acquisition procedure by scanning/processing each channel 225 one-by-one. For example, UE 205 would scan for signals in a channel 225 (e.g., eARFCN N−3). This would include UE 205 performing signal capture on that channel 225. UE 205 would then attempt to perform cell acquisition for that channel 225 to determine whether there is a suitable candidate base station available (e.g., using an autocorrelation based method to detect the narrowband PSS based on the MCL). UE 205 would then make a determination of whether there is a suitable candidate base station. If so, UE 205 would perform a cell connection procedure to establish a wireless connection with the candidate base station. If not, UE 205 would move on to the next channel 225 (e.g., eARFCN N−2) and repeat this procedure until a suitable candidate base station has been detected. In some aspects, the number of channels 225 (e.g., eARFCN(s)) within a frequency band may correspond to, but is not limited to, Table 1 below:

TABLE 1

| Frequency Band | | | | | | | | | | | | | |
|---|---|---|---|---|---|---|---|---|---|---|---|---|
| | 1 | 2 | 3 | 4 | 5 | 8 | 12 | 13 | 18 | 19 | 20 | 26 | 28 |
| Number of eARFCN | 600 | 600 | 750 | 0 | 250 | 350 | 180 | 100 | 90 | 0 | 300 | 70 | 450 |

In some aspects, UE 205 may spend up to 500 ms to scan each channel 225 (e.g., each eARFCN within the same and/or other frequency bands). Accordingly, to complete the scan of all eARFCNs may take up to 32 minutes assuming the 500 ms/channel scan time. Of course this time is not acceptable for cell acquisition in many, if not all, situations. For example, spending up to 32 minutes scanning for over-the-air signals would use substantial power, would result in unacceptable latency issues, and the like.

Within the context of narrowband IoT communications, this issue may be even more prevalent. That is, narrowband IOT device deployment has risen substantially and is expected to continue to increase within commercial markets. Generally, narrowband IoT devices may support communications in frequency bands 1, 2, 3, 4, 5, 8, 11, 12, 13, 14, 17, 18, 19, 20, 25, 26, 28, 31, 66, 70, 71, 72, 73, 74, and 85. The narrowband IoT raster may be 100 KHz and the bandwidth may be 180 KHz for some channels 225. In some aspects, UE 205 may, e.g., when configured as a narrowband IoT device, may be configured to scan each eARFCN for channel acquisition. As more bands are added to be scanned for channel acquisition, this may result in UE 205 spending even more time performing scanning—thus leading to more power consumption, delays, and the like.

Accordingly, aspects of the described techniques provide a more efficient offline batch-wise processing solution for scanning operations during cell acquisition. For example, UE 205 may identify or otherwise determine that it is to perform a cell acquisition procedure. For example, UE 205 may be initially powered on, cell service may be started/restarted at UE 205, and the like. Therefore, UE 205 may perform the cell acquisition procedure in order to connect to a base station. Accordingly, UE 205 may identify or otherwise determine, in accordance with the cell acquisition procedure, that it will scan one or more frequency bands during the cell acquisition procedure. For example, UE 205 may monitor for signals (e.g., over-the-air signals) from any proximate base station(s) to determine (e.g., based on the MCL 164 dB) whether there is a base station within range of UE 205 that can provide wireless service. For example, UE 205 may monitor for over-the-air signals from base station 210, base station 215, and/or a base station 220. In some aspects, UE 205 may monitor for any broadcast, synchronization, reference, and the like, signals in order to detect the presence of a suitable candidate base station. For example, UE 205 may monitor for a synchronization signal, such as a PSS and/or a secondary synchronization signal (SSS).

In some aspects, each of the over the air signals received by UE 205 may have a respective bandwidth that includes a corresponding plurality of channels 225 from the frequency band. For example, UE 205 may be configured with multiple (e.g., one or more) frequency bands (e.g., depending upon the frequency range(s) that UE 205 supports communications in, such as frequency range 1 (FR1), frequency range 2 (FR2), and the like) that it can scan to determine whether a suitable candidate base station is available. Each frequency band may include a plurality of channels 225 (e.g., eARFCN(s)), with each channel 225 having its own bandwidth (which may be the same or different than other channels 225). More particularly, each channel 225 may correspond to a code or index value that specifies a pair (or more than a pair) of reference frequencies (e.g., carrier/subcarrier frequency(ies)) used for wireless communications within the channel 225. UE 205 may scan for those reference/carrier frequencies in order to detect the presence of and/or quantify available candidate base station(s). Accordingly, UE 205 may receive over-the-air signals from base station 210, base station 215, and/or base station 220.

However, rather than process each channel 225 individually before moving on to the next channel 225, UE 205 may perform offline batch-wise processing of the over-the-air signals in order to determine whether a candidate base station is available. For example, UE 205 may be a multi-mode UE. A multimode UE may generally have capabilities that support offline batch-wise processing. For example, UE 205 may be configured with radio frequency (RF) capabilities that support the capture of a wide signal bandwidth (e.g., UE 205 may be able to monitor/receive in multiple channels 225 simultaneously. In another example, UE 205 may be configured with sufficient memory (e.g., buffers) available to store a larger number of over-the-air signal samples. In another example, UE 205 may be configured with multiple processing capabilities. For example, UE 205 may be configured to support simultaneously processing multiple narrowband signals.

Accordingly, UE 205 may monitor for and receive the over-the-air signals. The over-the-air signals may have a respective bandwidth that includes a plurality of channels 225. That is, UE 205 may monitor for and receive over-the-air signals from multiple channels 225 (e.g., from a plurality of eARFCNs). UE 205 may therefore perform over-the-air signal capture where the bandwidth of the signal includes K eARFCNs, with K being a positive integer value. In the non-limiting example illustrated in FIG. 2, K may be four (4), which means that UE 205 may monitor for and receive over-the-air signals from channels 225 corresponding to eARFCN N−3 to N. When monitoring for the over-the-air signals, UE 205 may monitor a wider bandwidth than is otherwise associated with the K channels 225, e.g., to account for any oscillator error, ensure that the K channels 225 are covered, etc. UE 205 may monitor for and receive the over-the-air signals during a time window established for signal capture to support a detection performance threshold. The captured over-the-air signals may be stored offline by UE 205. For example, UE 205 may store consecutively received over-the-air signals in different buffers for processing and evaluation. For example, UE 205 may store over-the-air signals from all of K channels 225 in a first buffer and/or may store individual over-the-air signals from each of or some of the K channels 225 in separate buffers.

In some aspects, UE 205 may process individual ones of the over-the-air signals offline. For example, the previously captured over-the-air samples may be processed for the K eARFCNs. This may include UE 205 processing a first over-the-air signal while monitoring for and receiving a second over-the-air signal. That is, UE 205 may process over-the-air signals, with each over-the-air signals corresponding to K channels 225, by identifying various metrics associated with the received over-the-air signals, such as received power level, interference levels, etc. Receiving/processing the over-the-air signals may also include UE 205 storing the over-the-air signals in buffer(s).

In some aspects, UE 205 may evaluate each of the channels 225 for cell acquisition on a batch-wise basis, and offline. For example, UE 205 may use an autocorrelation based evaluation approach based on an MCL to determine whether base station 210, base station 215, and/or base station 220 are suitable candidate base stations. UE 205 may evaluate each of the K channels 225 in parallel as a batch. For example, UE 205 may scan for a narrowband PSS in each of the K channels 225 to detect the presence of a suitable candidate base station. UE 205 may evaluate individual eARFCNs corresponding to the K channels 225. If UE 205 successfully detects a cell (e.g., a suitable candidate base station) based on the evaluation, UE 205 may terminate the cell acquisition procedure without completing a full frequency scan of the frequency bands. If not, UE 205 may complete a full frequency scan of each frequency band during the cell acquisition procedure. That is, UE 205 may continue to scan for K channels 225, store the over-the-air signals in buffers, and perform offline processing of the K channels 225, until at least one suitable candidate base station is detected. In some aspects, UE 205 may reduce power to various RF and/or other components during the processing/evaluation phases in order to conserve power. That is, RF components may consume a large portion of the UE's power. Turning off the RF components when more time is used for processing/evaluation of the received over-the-air signals may save considerable power of UE 205.

Moreover, processing/evaluating the received over-the-air signals corresponding to K channels 225 may save considerable time. That is, collecting samples of K channels 225, storing those samples in buffers, and the performing offline processing of the K channels 225 in accordance with the described techniques may result in considerable time savings for the cell acquisition procedure. For example, setting K to four may result in approximately a 75 percent reduction in time associated with the cell acquisition scanning procedure. This may significantly reduce the time associated with the cell acquisition procedure, and may save significant UE power. Using the batch-wise evaluation of the K channels 225, UE 205 may acquire a cell and may establish a connection with base station 210, base station 215, or base station 220, based on the signal evaluations. UE 205 may perform wireless communications using the connection.

Figure 3:
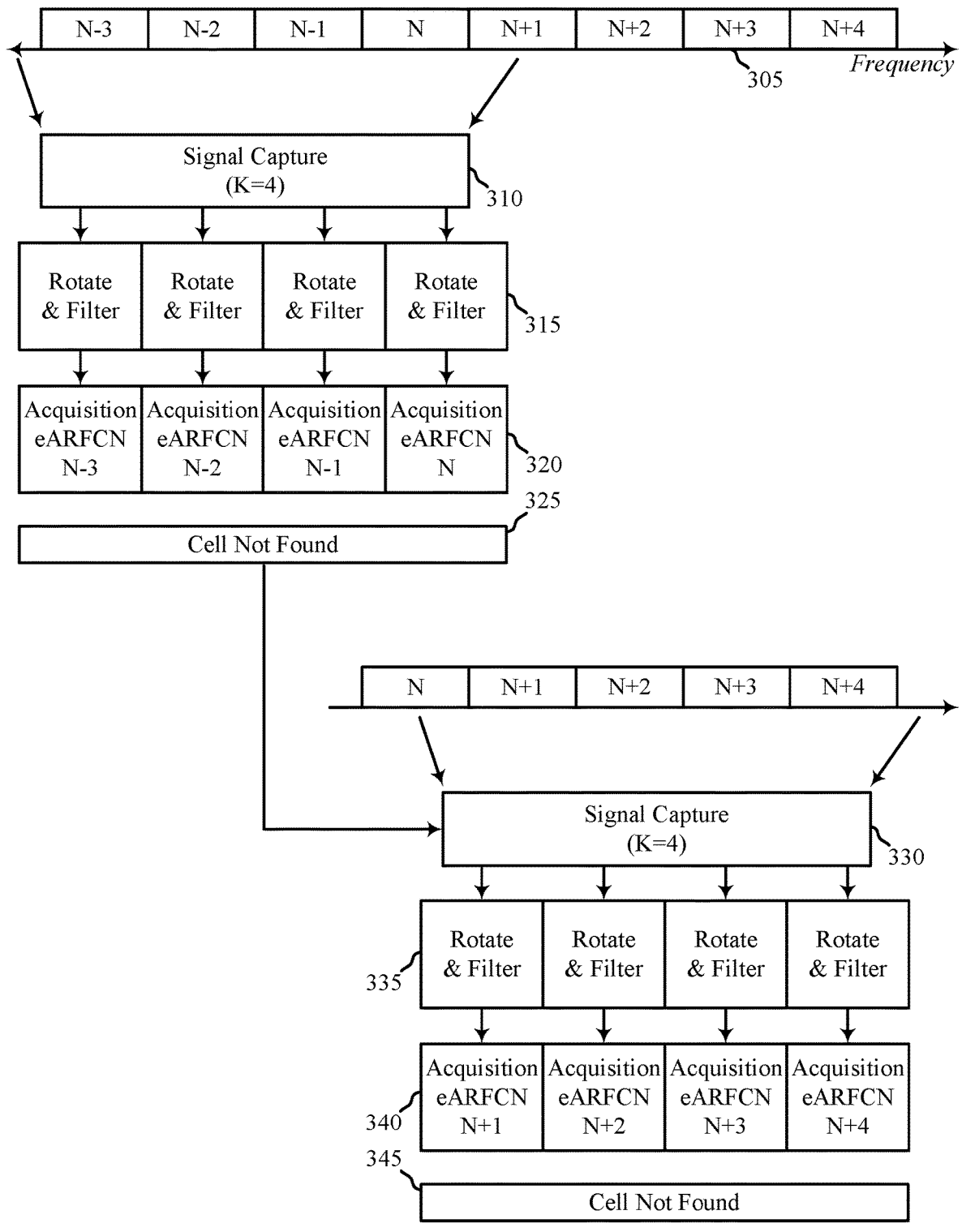
FIG. 3 illustrates an example of a batch-scan configuration that supports batch-wise frequency scanning in accordance with aspects of the present disclosure.

FIG. 3 illustrates an example of a batch-scan configuration 300 that supports batch-wise frequency scanning in accordance with aspects of the present disclosure. Batch-scan configuration 300 may implement aspects of wireless communication systems 100 and/or 200. Aspects of batch-scan configuration 300 may be implemented by a UE, which may be an example of the corresponding device described herein.

As discussed above, aspects of the described techniques support a UE performing offline, batch-wise processing of over-the-air signals having a bandwidth spanning a plurality of channels 305 (e.g., eARFCNs). For example, the UE may identify or otherwise determine that a sale acquisition procedure is to be performed by the UE. This may include the UE scanning one or more frequency bands (e.g., frequency band 1, 2, 3, 4, 5, 8, 12, etc.) during the cell acquisition procedure. For example, the UE may identify frequency bands that it supports communications using, and then identify the channels 305 (e.g., eARFCNs) associated with each frequency band. Each channel 305 may correspond to one or more reference frequencies (e.g., set of carrier/carrier frequency).

In accordance with the described techniques, the UE may identify or otherwise select K channels 305 to scan. K may correspond to the number of channel 305 (e.g., eARFCNs) that the UE will scan individually, batch-wise, or collectively during the scanning procedure. In the non-limiting example illustrated in FIG. 3, K may be set to four and the UE may begin by scanning K channels 305 corresponding to eARFCN N−3, N−2, N−1, and N. The UE may scan a wider bandwidth than the K channels 305 to improve reception. Accordingly, the UE may receive one or more over-the-air signals, with each signal having a bandwidth including the plurality of channels 305 from the frequency band. The UE may process individual over-the-air signals and evaluate each channel for cell acquisition in batches of the over-the-air signals.

In some aspects, this may include the UE performing signal capture 310 where the UE receives over-the-air signals. In the non-limiting example illustrated in FIG. 3, the UE may set K to four indicating that the UE will monitor for and receive over-the-air signals corresponding to four channels (e.g., four eARFCNs corresponding to N−3, N−2, N−1, and N). The UE may store the samples (e.g., the over-the-air signals) in one or more buffers. For example, the UE may store consecutively received over-the-air signals in different buffers for offline processing and evaluation.

In some aspects, K may be configured for the UE using various configuration signaling, e.g., RRC signaling, MAC CE, DCI, higher layer signaling, and the like. In some aspects, K may be selected or otherwise identified by the UE autonomously, e.g., without coordination with and/or configuration by the network. In some aspects, K may be based on the capabilities of the UE, e.g., the number of buffers, processors, etc., that the UE has.

The UE may then rotate and filter 315 the samples (e.g., the received over-the-air signals). For example, the UE may perform phase/frequency adjustments of the over-the-air signals, filter our spurious and/or noise frequencies, and the like. The UE may, during signal capture 310 and/or rotate and filter 315, identify the receive signal power level for each received over-the-air signal. Rotate and filter 315 may be performed offline. That is, rotate and filter 315 may be performed after the UE has received and stored the over-the-air signals.

The UE may then perform cell acquisition 320 to evaluate each of the channels 305. The UE may evaluate the channels 305 in corresponding batches for each of the over-the-air signals. That is, the UE may evaluate the over-the-air signals corresponding to channels 305 associated with eARFCNs N−3, N−2, N−1, and N as a batch using an offline processor(s) accessing the buffer(s) used to store the samples. In some aspects, this may include the UE comparing the receive signal strength of the received over-the-air signals to the MCL or any other threshold in order to determine whether there are any suitable candidate base stations to establish a connection with. Accordingly, at determination 325 the UE may determine whether there are any candidate base stations suitable to perform a cell acquisition procedure with. In the non-limiting example illustrated in FIG. 3, the UE may determine that there are no candidate base stations available. Accordingly, the UE may continue the batch-wise offline processing of other channels 305.

That is, the UE may terminate the cell acquisition procedure without completing a full frequency scan of each frequency bands when the UE successfully detects a cell during cell acquisition 320. If the evaluation is unsuccessful (e.g., the UE does not detect any over-the-air signals satisfying a threshold value, such as the MCL threshold), the UE may continue (and possibly complete, depending on the result of each iteration) with a full frequency scan of the frequency bands that the UE supports.

Accordingly, this may include the UE performing signal capture 330 where the UE receives over-the-air signals. In the non-limiting example illustrated in FIG. 3, the UE may set K to four indicating that the UE will monitor for and receive over-the-air signals corresponding to four channels (e.g., four eARFCNs corresponding to N+1, N+2, N+3, and N+4). The UE may store the samples (e.g., the over-the-air signals) in one or more buffers. For example, the UE may store consecutively received over-the-air signals in different buffers for offline processing and evaluation.

The UE may then rotate and filter 335 the samples (e.g., the received over-the-air signals). For example, the UE may perform phase/frequency adjustments of the over-the-air signals, filter our spurious and/or noise frequencies, and the like. The UE may, during signal capture 330 and/or rotate and filter 335, identify the receive signal power level for each received over-the-air signal. Rotate and filter 335 may be performed offline. That is, rotate and filter 335 may be performed after the UE has received and stored the over-the-air signals.

The UE may then perform cell acquisition 340 to evaluate each of the channels 305. The UE may evaluate the channels 305 in corresponding batches for each of the over-the-air signals. That is, the UE may evaluate the over-the-air signals corresponding to channels 305 associated with eARFCNs N+1, N+2, N+3, and N+4 as a batch using an offline processor(s) accessing the buffer(s) used to store the samples. In some aspects, this may include the UE comparing the receive signal strength of the received over-the-air signals to the MCL or any other threshold in order to determine whether there are any suitable candidate base stations to establish a connection with. Accordingly, at determination 345 the UE may determine whether there are any candidate base stations suitable to perform a cell acquisition procedure with. In the non-limiting example illustrated in FIG. 3, the UE may determine that there are still no candidate base stations available. Accordingly, the UE may continue the batch-wise offline processing of other channels 305, e.g., eARFCNs corresponding to N+5, N+6, etc.

Accordingly, the UE may continue these iterations until a suitable candidate base station is detected. Once detected, the UE may perform the cell acquisition procedure with the base station to establish a wireless connection.

Figure 4:
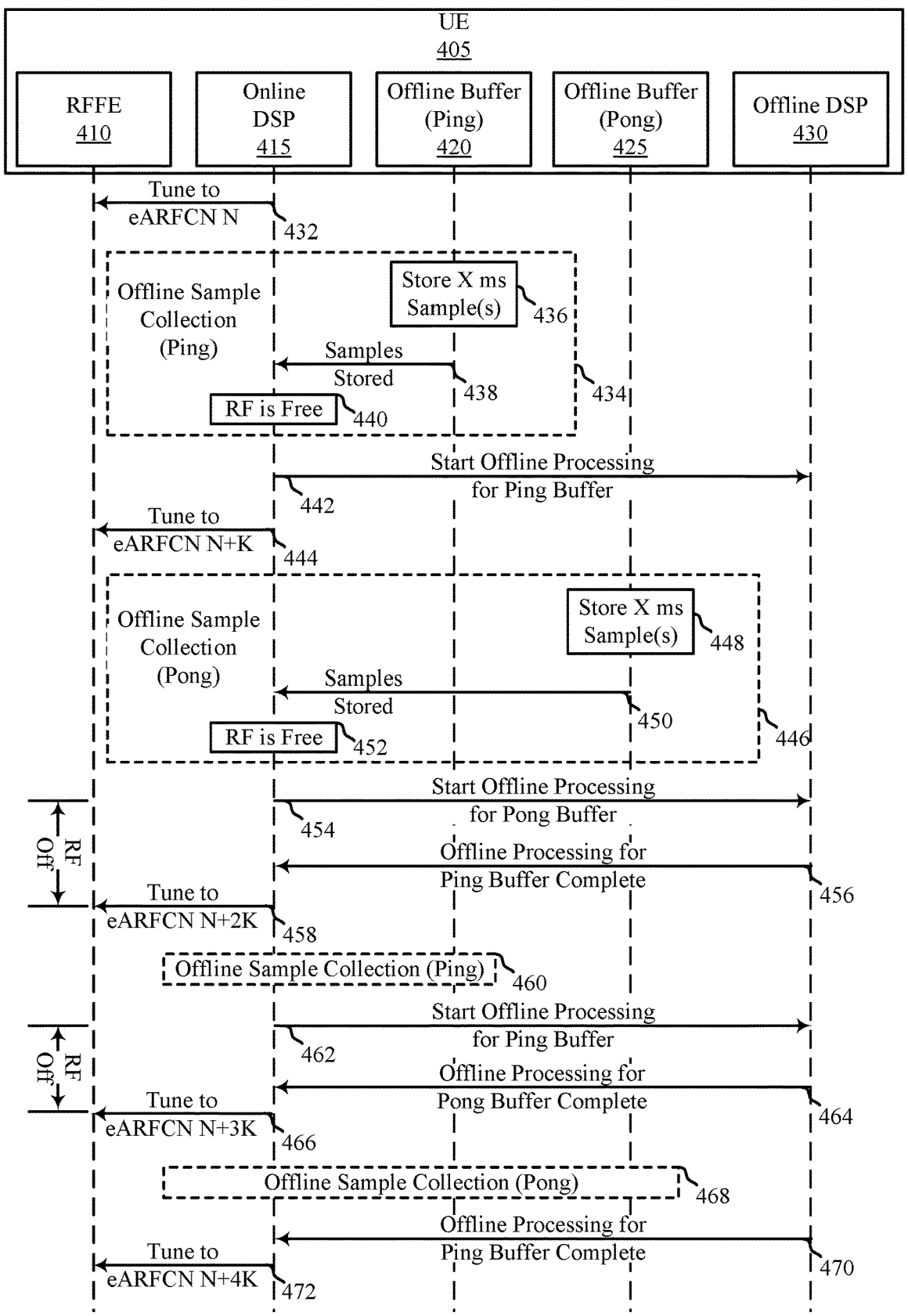
FIG. 4 illustrates an example of a process that supports batch-wise frequency scanning in accordance with aspects of the present disclosure.

FIG. 4 illustrates an example of a process 400 that supports batch-wise frequency scanning in accordance with aspects of the present disclosure. Process 400 may implement aspects of wireless communication systems 100 and/or 200 and/or batch-scan configuration 300. Process 400 may be implemented at or implemented by a UE 405, which may be an example of the corresponding device described herein.

In some aspects, UE 405 may include a RF front end (RFFE) 410, an online digital signal processor (DSP) 415, an offline buffer 420 (which may be referred to as a Ping buffer), an offline buffer 425 (which may be referred to as a Pong buffer), and/or an offline DSP 430. It is to be understood that process 400 is not limited to UE 405 having two processors (online DSP 415 and offline DSP 430) and/or two offline buffers. Moreover, it is to be understood that offline DSP 430 is an offline buffer in the sense that offline DSP 430 may perform batch-wise evaluation of samples during a cell acquisition procedure.

As discussed above, aspects of the described techniques provide various mechanisms to support off-line, batch-wise processing of over-the-air signals corresponding to a plurality of channels (e.g., eARFCNs) during scanning operations for cell acquisition. For example, UE 405 may identify or otherwise determine that it is to scan one or more frequency bands (e.g., frequency band 1, 2, 3, etc., within one or more frequency ranges that UE 405 supports communications using). Accordingly, UE 405 may receive over-the-air signals and process individual over-the-air signals (e.g., store those samples in a buffer). UE 405 may evaluate each channel (e.g., each eARFCN) by evaluating the over-the-air signals in batches. UE 405 may acquire a cell using the batch-wise evaluation of the corresponding channels to establish a connection to a base station. Process 400 illustrates one non-limiting example of such processing and off-line batch-wise evaluation.

At 432, online DSP 415 may transmit, provide, or otherwise convey (and RFFE 410 may receive, obtain, or otherwise identify) an indication to tune to eARFCN N (e.g., channel N). In some aspects, the indication may be provided in response to UE 405 identifying or otherwise determining that it is to scan one or more frequency bands during a cell acquisition procedure. For example, UE 405 may be initially powered on, cell-service may be restored, and the like, and therefore determine that a cell acquisition procedure is to be performed in order to establish an RRC connection with a suitable candidate base station. UE 405 may identify, select, or otherwise determine frequency range(s) that it supports communications using. Each frequency Range may have a corresponding plurality of frequency bands, with each frequency band having a plurality of channels (e.g., such as is illustrated in Table 1 above). Accordingly, online DSP 415 may identify or otherwise select channel N (e.g., eARFCN N) of a frequency band to begin the scanning procedure to detect suitable candidate base stations.

In some aspects, this may initiate an off-line sample collection process 434 for the Ping buffer. The off-line sample collection process 434 may include at 436 UE 405 storing samples (e.g., over-the-air signals) in the Ping buffer for X milliseconds. As discussed above, this may include the indication conveyed at 432 also including an indication of K channels to be sampled. Accordingly, off-line sample collection process 434 may include RFFE 410 collecting samples for channel N, for channel N+1, for channel N+2, and for channel N+3, in the example where K=4. It is to be understood that different values of K may also be used. Accordingly, at 436 UE 405 may store (e.g., process individual ones of the over-the-air signals) samples in the Ping buffer for each channel of the K channels.

The off-line sample collection process 434 may continue at 438 where the Ping buffer transmits, provides, or otherwise conveys (and online DSP 415 receives, obtains, or otherwise identifies) an indication that the samples have been stored in the Ping buffer. That is, the indication may provide information associated with the Ping buffer storing an over-the-air signal (e.g., a sample) for channel N, for channel N+1, for channel N+2, and for channel N+3 (continuing with the example where K=4). Accordingly at 440, online DSP 415 may determine that RFFE 410 is free. That is, online DSP 415 may determine that RFFE 410 has completed receiving the over-the-air signals for the appropriate channels and that those samples have been stored in the Ping buffer. Broadly, this may complete this iteration of the off-line sample collection process 434.

Accordingly and at 442, online DSP 415 may transmit, provide, or otherwise convey (and off-line DSP 430 may receive, obtain, or otherwise identify) an indication to start off-line processing for the Ping buffer. That is, online DSP 415 may provide an indication to off-line DSP 430 that the Ping buffer has stored samples (e.g., over-the-air signals) for channels N through N+3. Accordingly, off-line DSP 430 may evaluate, in corresponding batches for each of the over-the-air signals, each corresponding channel for cell acquisition. That is, off-line DSP 430 may process the batch of samples stored in the Ping buffer to determine whether any over-the-air signal(s) indicate(s) that a suitable candidate base station is available for cell acquisition. For example, off-line DSP 430 may utilize a threshold (e.g., MCL or other threshold) to determine whether a synchronization signal was received during the off-line sample collection process 434. If a synchronization signal was received and satisfies a threshold, this might indicate that UE 405 can connect to a corresponding base station transmitting that synchronization signal for wireless communications. If not, UE 405 may continue the RF scan procedure in the next batch of channels.

While off-line DSP 430 processes the batch of samples stored in the Ping buffer, UE 405 may continue the RF scan procedure. That is, rather than wait for off-line DSP 432 to evaluate the samples stored in the Ping buffer for channels N through N+3, UE 405 may continue the RF scan procedure to reduce the time it takes to establish a connection to a suitable candidate base station. Accordingly and at 444, online DSP 415 may transmit, provide, or otherwise convey (and RFFE 410 may receive, obtain, or otherwise identify) an indication to tune to eARFCN N+K (e.g., channel N+4 in this example where K=4). In some aspects, the indication may be provided in response to UE 405 identifying or otherwise determining that it is to scan one or more frequency bands during a cell acquisition procedure and that offline DSP 430 is performing offline evaluation of the samples stored in the Ping buffer.

In some aspects, this may initiate an off-line sample collection process 446 for the Pong buffer. The off-line sample collection process 446 may include at 448 UE 405 storing samples (e.g., over-the-air signals) in the Pong buffer for X milliseconds. As discussed above, this may include the indication conveyed at 444 also including an indication of K channels to be sampled. Accordingly, off-line sample collection process 446 may include RFFE 410 collecting samples for channel N+4, channel N+5, channel N+6, and channel N+7, when K is again set to four. It is to be understood that different values of K may also be used. Accordingly, at 448 UE 405 may store (e.g., process individual ones of the over-the-air signals) samples in the Pong buffer for each channel of the N+K channels.

The off-line sample collection process 446 may continue at 450 where the Pong buffer transmits, provides, or otherwise conveys (and online DSP 415 receives, obtains, or otherwise identifies) an indication that the samples have been stored in the Pong buffer. That is, the indication may provide information associated with the Pong buffer storing over-the-air signals (e.g., samples) for channel N+4, channel N+5, channel N+6, and channel N+7 (continuing with the example where K=4). Accordingly at 452, online DSP 415 may determine that RFFE 410 is free. That is, online DSP 415 may determine that RFFE 410 has completed receiving the over-the-air signals and that those samples have been stored in the Pong buffer. Broadly, this may complete this iteration of the off-line sample collection process 446.

Accordingly and at 454, online DSP 415 may transmit, provide, or otherwise convey (and off-line DSP 430 may receive, obtain, or otherwise identify) an indication to start off-line processing for the Pong buffer. That is, online DSP 415 may provide an indication to off-line DSP 430 that the Pong buffer has stored samples (e.g., over-the-air signals) for channels N+4 through N+7 (continuing with the example where K=4). Accordingly, off-line DSP 430 may evaluate, in corresponding batches for each of the over-the-air signals, each corresponding channel for cell acquisition. That is, off-line DSP 430 may process the batch of samples stored in the Pong buffer to determine whether any over-the-air signal(s) indicate(s) that a suitable candidate base station is available for cell acquisition. For example, off-line DSP 430 may utilize a threshold (e.g., MCL or other threshold) to determine whether a synchronization signal was received during the off-line sample collection process 446. If a synchronization signal was received and satisfies this threshold, this might indicate that UE 405 can connect to a corresponding base station transmitting that synchronization signal for wireless communications. If not, UE 405 may continue the RF scan procedure for the next batch of channels.

At 456, offline DSP 430 may transmit, provide, or otherwise convey (and online DSP 415 may receive, obtain, or otherwise identify) an indication that the off-line processing for the Ping buffer has been completed. In the non-limiting example illustrated in FIG. 4, the indication may also provide information indicating that evaluation of the batch of samples stored in the Ping buffer for channels N through N+3 did not result in a suitable candidate base station being identified. Accordingly, UE 405 may continue the RF scan procedure for the next batch of K channels.

Broadly, it is to be understood that the process discussed above may be repeated for in an iterative fashion for each batch of K channels until a suitable candidate base station has been identified.

Accordingly and at 458, online DSP 415 may transmit, provide, or otherwise convey (and RFFE 410 may receive, obtain, or otherwise identify) an indication to tune to eARFCN N+2K (e.g., channel N+8). In some aspects, the indication may be provided in response to UE 405 identifying or otherwise determining that the offline sample collection process 434 for the Ping buffer has completed and did not result in a suitable candidate base station being identified.

In some aspects, this may initiate off-line sample collection process 460 for the Ping buffer (e.g., similar to the off-line sample collection process 434 for the Ping buffer). The off-line sample collection process 460 may include UE 405 storing samples (e.g., over-the-air signals) in the Ping buffer for X milliseconds. As discussed above, this may include the indication conveyed at 458 also including an indication of K channels to be sampled. Accordingly, off-line sample collection process 460 may include RFFE 410 collecting samples for channel N+8, for channel N+9, for channel N+10, and for channel N+11, when K is again set to four. It is to be understood that different values of K may also be used. Accordingly, UE 405 may store (e.g., process individual ones of the over-the-air signals) in the Ping buffer for each channel of the K channels starting at channel N+8.

At 462, online DSP 415 may transmit, provide, or otherwise convey (and off-line DSP 430 may receive, obtain, or otherwise identify) an indication to start off-line processing for the Ping buffer. That is, online DSP 415 may provide an indication to off-line DSP 430 that the Ping buffer has stored samples (e.g., over-the-air signals) for channels N+8 through N+11. Accordingly, off-line DSP 430 may evaluate, in corresponding batches for each of the over-the-air signals, each corresponding channel for cell acquisition. That is, off-line DSP 430 may process the batch of samples stored in the Ping buffer to determine whether any over-the-air signal(s) indicate(s) that a suitable candidate base station is available for cell acquisition. For example, off-line DSP 430 may utilize a threshold (e.g., MCL or other threshold) to determine whether a synchronization signal was received during the off-line sample collection process 460. If a synchronization signal was received and satisfies a threshold, this might indicate that UE 405 can connect to a corresponding base station transmitting that synchronization signal for wireless communications. If not, UE 405 may continue the RF scan procedure in the next batch of K channels.

At 464, offline DSP 430 may transmit, provide, or otherwise convey (and online DSP 415 may receive, obtain, or otherwise identify) an indication that the off-line processing for the Pong buffer has been completed. In the non-limiting example illustrated in FIG. 4, the indication may also provide information indicating that evaluation of the batch of samples stored in the Pong buffer for channels N+4 through N+7 did not result in a suitable candidate base station being identified. Accordingly, UE 405 may continue the RF scan procedure for the next batch of K channels.

Accordingly and at 466, online DSP 415 may transmit, provide, or otherwise convey (and RFFE 410 may receive, obtain, or otherwise identify) an indication to tune to eARFCN N+3K (e.g., channel N+12). In some aspects, the indication may be provided in response to UE 405 identifying or otherwise determining that the offline sample collection process 446 for the Pong buffer did not result in a suitable candidate base station being identified. In some aspects, this may initiate off-line sample collection process 468 for the Pong buffer (e.g., similar to the off-line sample collection process 446 for the Pong buffer). The off-line sample collection process 468 may include UE 405 storing samples (e.g., over-the-air signals) in the Pong buffer for X milliseconds. As discussed above, this may include the indication conveyed at 466 also including an indication of K channels to be sampled. Accordingly, off-line sample collection process 468 may include RFFE 410 collecting samples for channel N+12, for channel N+13, for channel N+14, and for channel N+15, when K is again set to four. It is to be understood that different values of K may also be used. Accordingly, UE 405 may store (e.g., process individual ones of the over-the-air signals) in the Pong buffer for each channel of the K channels starting at channel N+12.

Again, this iterative process of sample collection/off-line evaluation may be continued until UE 405 identifies a suitable candidate base station to establish a connection with. Accordingly, at 470 offline DSP 430 may transmit, provide, or otherwise convey (and online DSP 415 may receive, obtain, or otherwise identify) an indication that the offline sample evaluation of the samples stored in the Ping buffer during offline sample collection process 460 did not result in a suitable candidate base station being identified. Accordingly and at 472, online DSP 415 may transmit, provide, or otherwise convey (and RFFE 410 may receive, obtain, or otherwise identify) an indication for RFFE 410 to tune to eARFCN N+4K (e.g., channel N+16). In some aspects, the indication may be provided in response to UE 405 identifying or otherwise determining that the offline sample collection process 460 for the Ping buffer did not result in a suitable candidate base station being identified. In some aspects, this may initiate another off-line sample collection process for the Ping buffer (e.g., similar to the off-line sample collection processes 434 and/or 460 for the Ping buffer). This iterative approach may continue until a suitable candidate base station has been identified. UE 405 may acquire a cell (e.g., connect to a suitable candidate base station) using the batch-wise evaluation of the channels once a sample indicates the availability of the candidate base station.

In addition to reducing the RF scan time during cell acquisition, process 400 also provide power saving features for UE 405. For example, during the time between RFFE 410 collecting over-the-air samples for the Ping and Pong buffers (e.g., when the RFFE 410 is free) and the next indication to tune to the next batch of K channels, various RF components of UE 405 may have their power reduced. For example, power amplifiers, filters, oscillators, etc., of RFFE 410 may be powered down to conserve power.

Figure 5:
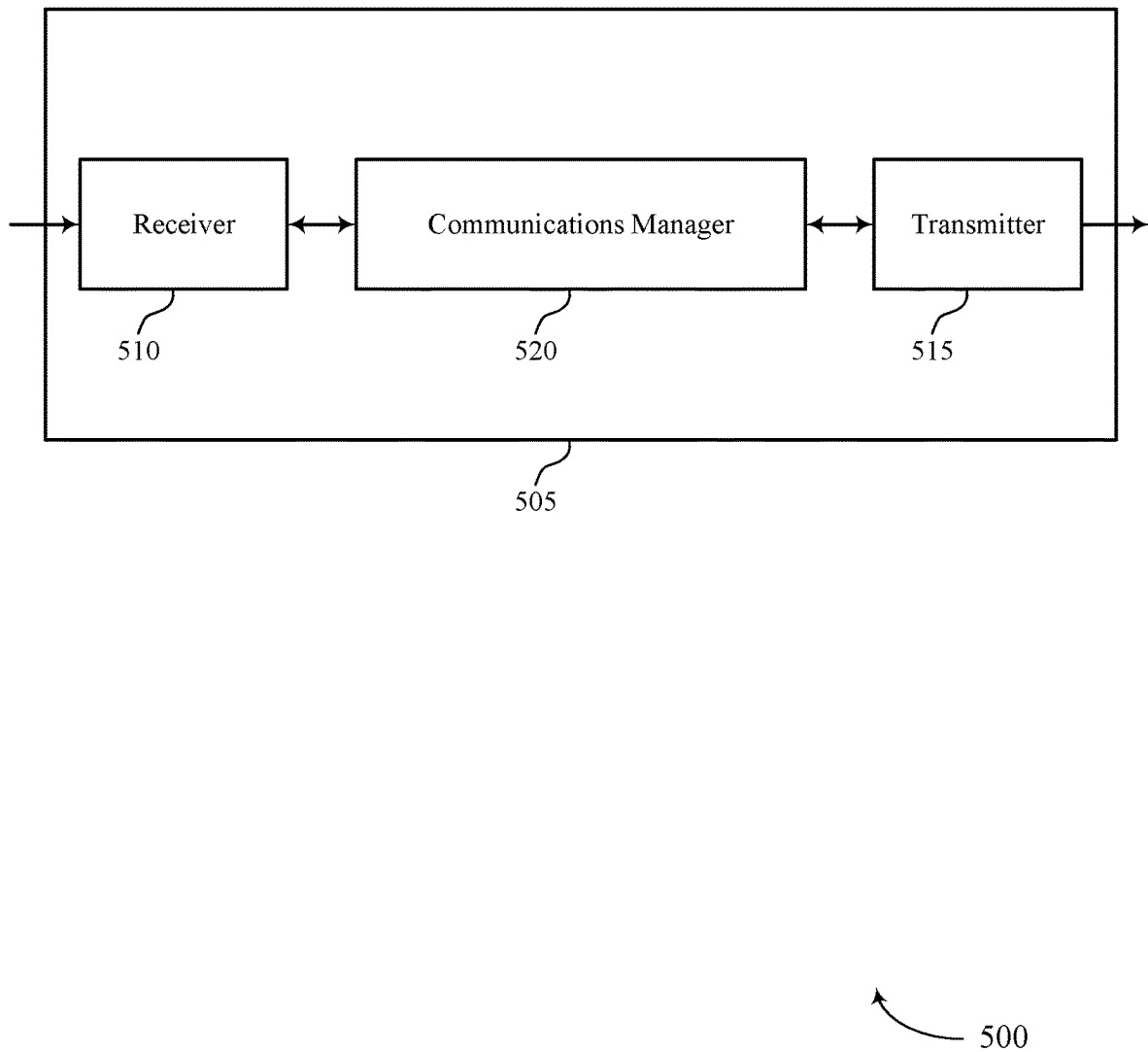
FIGS. 5 and 6 show block diagrams of devices that support batch-wise frequency scanning in accordance with aspects of the present disclosure.

FIG. 5 shows a block diagram 500 of a device 505 that supports batch-wise frequency scanning in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to batch-wise frequency scanning). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to batch-wise frequency scanning). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of batch-wise frequency scanning as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for identifying that the UE is to scan one or more frequency bands during a cell acquisition procedure. The communications manager 520 may be configured as or otherwise support a means for receiving one or more over-the-air signals, each of the one or more over-the-air signals having a respective bandwidth that includes a corresponding set of multiple channels from a frequency band of the one or more frequency bands. The communications manager 520 may be configured as or otherwise support a means for processing individual ones of the one or more over-the-air signals. The communications manager 520 may be configured as or otherwise support a means for evaluating, in corresponding batches for each of the individual ones of the one or more over-the-air signals, each of the corresponding pluralities of channels for cell acquisition. The communications manager 520 may be configured as or otherwise support a means for acquiring a cell via batch-wise evaluation of the corresponding pluralities of channels.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for batch-wise collection of samples for K channels and offline processing of those samples to conserve power, reduce the RF scan time, and the like.

Figure 6:
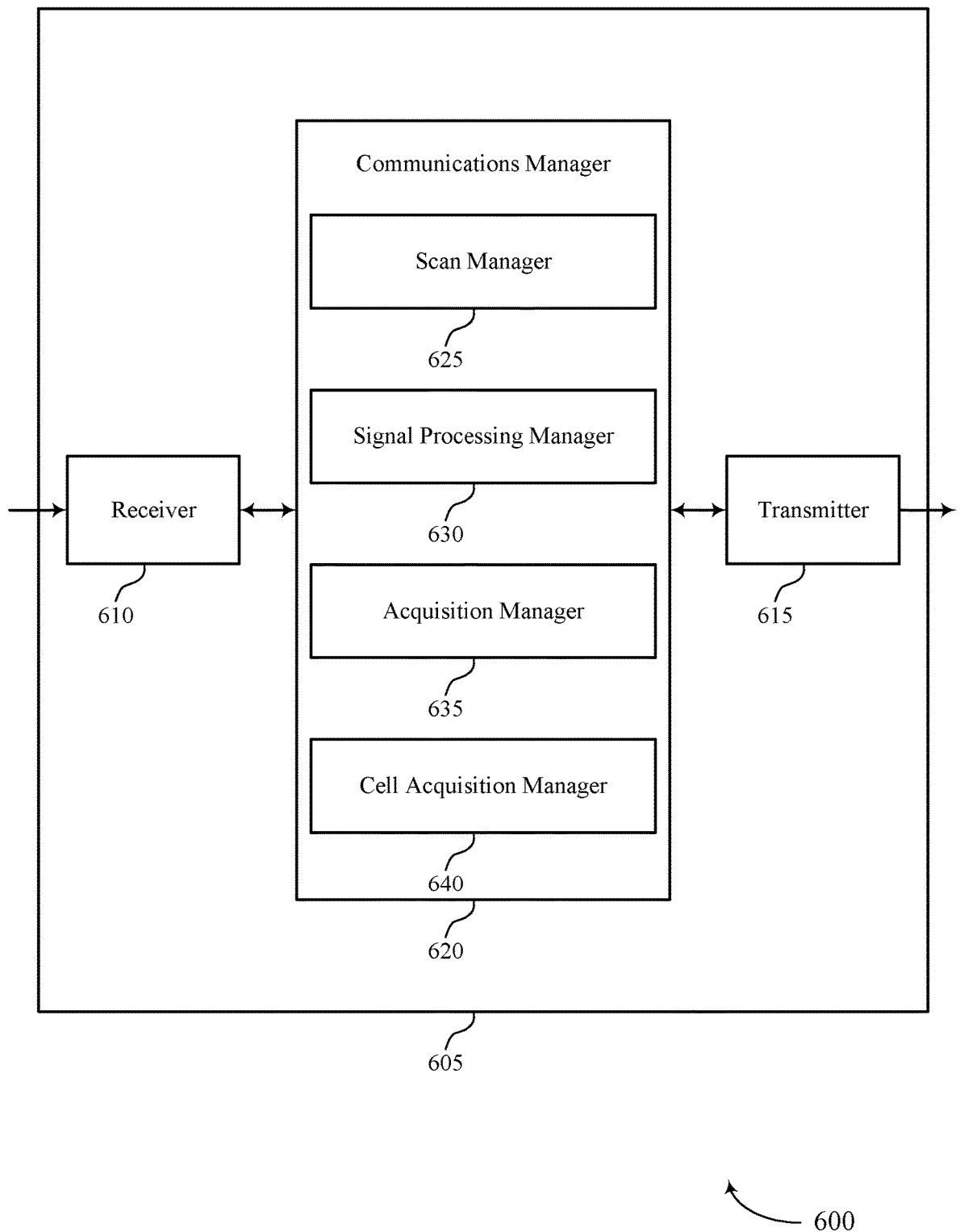

FIG. 6 shows a block diagram 600 of a device 605 that supports batch-wise frequency scanning in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to batch-wise frequency scanning). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to batch-wise frequency scanning). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of batch-wise frequency scanning as described herein. For example, the communications manager 620 may include a scan manager 625, a signal processing manager 630, an acquisition manager 635, a cell acquisition manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The scan manager 625 may be configured as or otherwise support a means for identifying that the UE is to scan one or more frequency bands during a cell acquisition procedure. The signal processing manager 630 may be configured as or otherwise support a means for receiving one or more over-the-air signals, each of the one or more over-the-air signals having a respective bandwidth that includes a corresponding set of multiple channels from a frequency band of the one or more frequency bands. The signal processing manager 630 may be configured as or otherwise support a means for processing individual ones of the one or more over-the-air signals. The acquisition manager 635 may be configured as or otherwise support a means for evaluating, in corresponding batches for each of the individual ones of the one or more over-the-air signals, each of the corresponding pluralities of channels for cell acquisition. The cell acquisition manager 640 may be configured as or otherwise support a means for acquiring a cell via batch-wise evaluation of the corresponding pluralities of channels.

Figure 7:
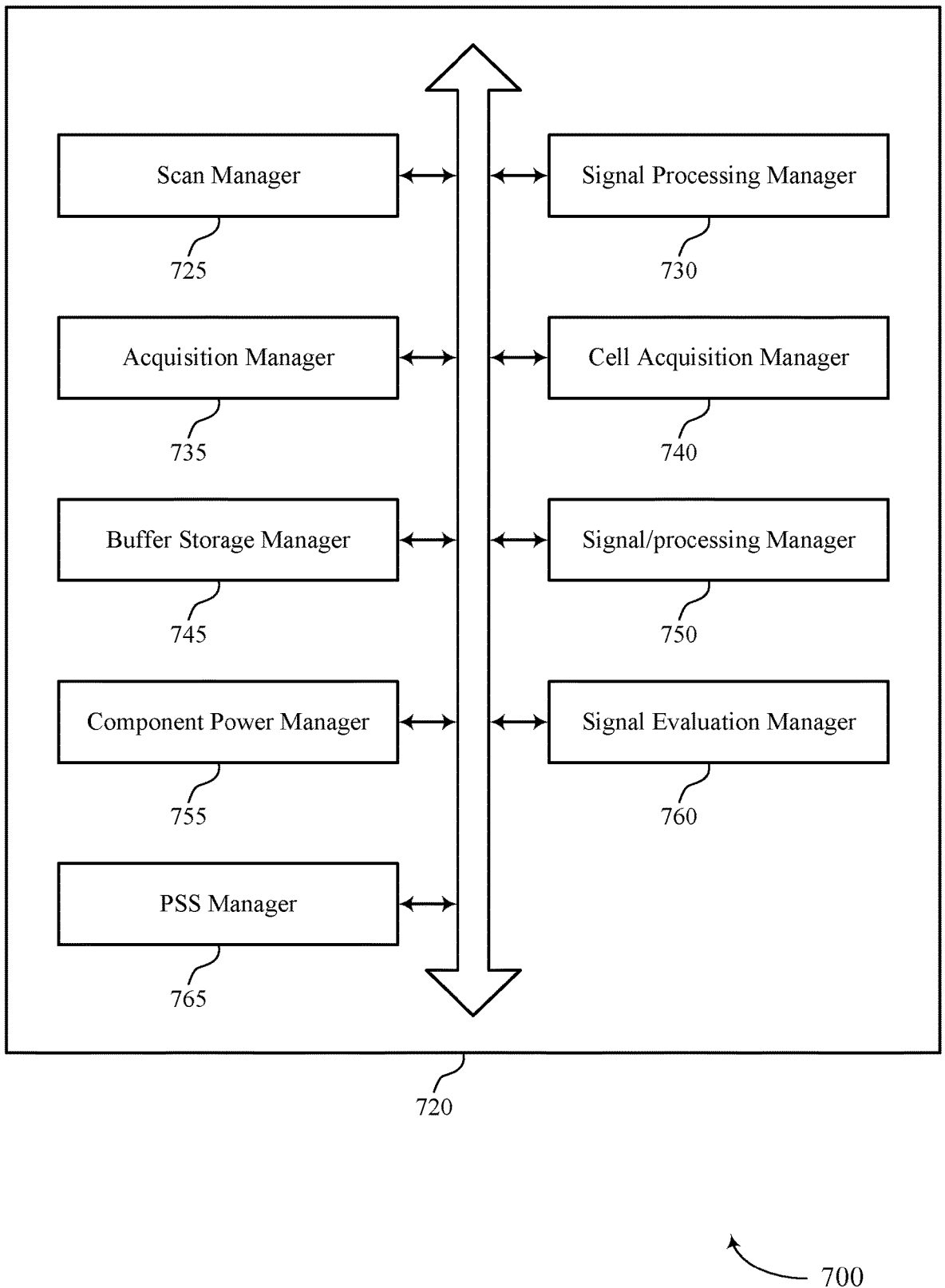
FIG. 7 shows a block diagram of a communications manager that supports batch-wise frequency scanning in accordance with aspects of the present disclosure.

FIG. 7 shows a block diagram 700 of a communications manager 720 that supports batch-wise frequency scanning in accordance with aspects of the present disclosure. The communications manager 720 may be an example of aspects of a communications manager 520, a communications manager 620, or both, as described herein. The communications manager 720, or various components thereof, may be an example of means for performing various aspects of batch-wise frequency scanning as described herein. For example, the communications manager 720 may include a scan manager 725, a signal processing manager 730, an acquisition manager 735, a cell acquisition manager 740, a buffer storage manager 745, a signal/processing manager 750, a component power manager 755, a signal evaluation manager 760, an PSS manager 765, or any combination thereof. Each of these components may communicate, directly or indirectly, with one another (e.g., via one or more buses).

The communications manager 720 may support wireless communication at a UE in accordance with examples as disclosed herein. The scan manager 725 may be configured as or otherwise support a means for identifying that the UE is to scan one or more frequency bands during a cell acquisition procedure. The signal processing manager 730 may be configured as or otherwise support a means for receiving one or more over-the-air signals, each of the one or more over-the-air signals having a respective bandwidth that includes a corresponding set of multiple channels from a frequency band of the one or more frequency bands. In some examples, the signal processing manager 730 may be configured as or otherwise support a means for processing individual ones of the one or more over-the-air signals. The acquisition manager 735 may be configured as or otherwise support a means for evaluating, in corresponding batches for each of the individual ones of the one or more over-the-air signals, each of the corresponding pluralities of channels for cell acquisition. The cell acquisition manager 740 may be configured as or otherwise support a means for acquiring a cell via batch-wise evaluation of the corresponding pluralities of channels.

In some examples, to support receiving the one or more over-the-air signals, the buffer storage manager 745 may be configured as or otherwise support a means for storing consecutively-received ones of the over-the-air signals in different buffers for processing and evaluating of the over-the-air signals.

In some examples, to support processing the individual ones of the one or more over-the-air signals, the signal/processing manager 750 may be configured as or otherwise support a means for processing a first over-the-air signal of the one or more over-the-air signals while receiving a second over-the-air signal of the one or more over-the-air signals.

In some examples, the component power manager 755 may be configured as or otherwise support a means for reducing power to radio frequency components of the UE during at least a portion of the processing of the individual ones of the one or more over-the-air signals.

In some examples, to support evaluating each of the corresponding pluralities of channels for cell acquisition, the signal evaluation manager 760 may be configured as or otherwise support a means for evaluating, as a batch, each of the corresponding pluralities of channels in parallel.

In some examples, to support evaluating each of the corresponding pluralities of channels for cell acquisition, the PSS manager 765 may be configured as or otherwise support a means for scanning for a narrowband primary synchronization signal in each of the corresponding pluralities of channels.

In some examples, the signal processing manager 730 may be configured as or otherwise support a means for completing a full frequency scan of each of the one or more frequency bands during the cell acquisition procedure.

In some examples, the cell acquisition manager 740 may be configured as or otherwise support a means for terminating the cell acquisition procedure without completing a full frequency scan of each of the one or more frequency bands based on a successful detection of a cell during the evaluating.

In some examples, to support evaluating each of the corresponding pluralities of channels for cell acquisition, the acquisition manager 735 may be configured as or otherwise support a means for evaluating individual eARFCNs within a single over-the-air signal of the one or more over-the-air signals. In some examples, the UE is a narrow-band IoT device.

Figure 8:
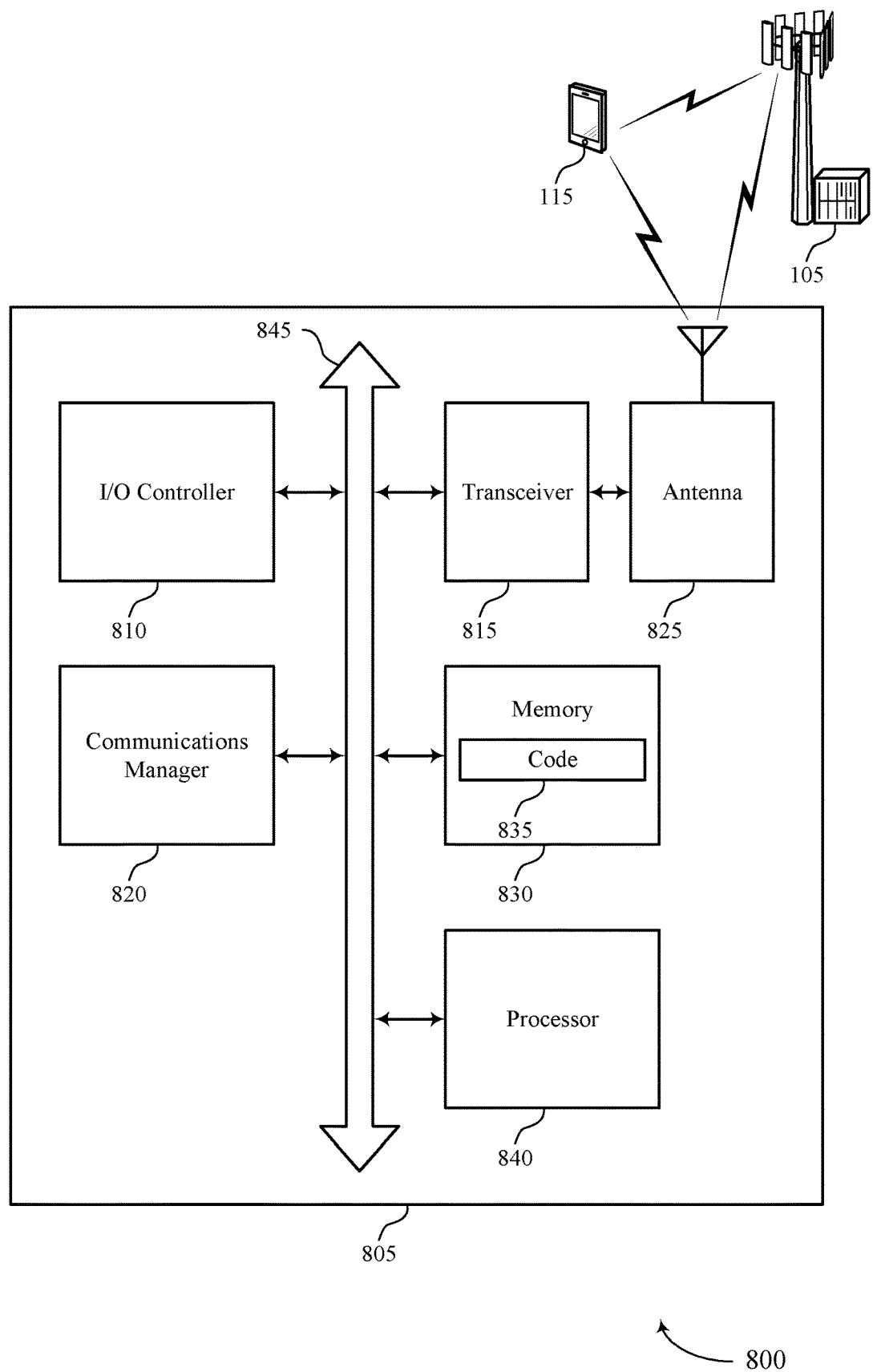
FIG. 8 shows a diagram of a system including a device that supports batch-wise frequency scanning in accordance with aspects of the present disclosure.

FIG. 8 shows a diagram of a system 800 including a device 805 that supports batch-wise frequency scanning in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting batch-wise frequency scanning). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for identifying that the UE is to scan one or more frequency bands during a cell acquisition procedure. The communications manager 820 may be configured as or otherwise support a means for receiving one or more over-the-air signals, each of the one or more over-the-air signals having a respective bandwidth that includes a corresponding set of multiple channels from a frequency band of the one or more frequency bands. The communications manager 820 may be configured as or otherwise support a means for processing individual ones of the one or more over-the-air signals. The communications manager 820 may be configured as or otherwise support a means for evaluating, in corresponding batches for each of the individual ones of the one or more over-the-air signals, each of the corresponding pluralities of channels for cell acquisition. The communications manager 820 may be configured as or otherwise support a means for acquiring a cell via batch-wise evaluation of the corresponding pluralities of channels.

By including or configuring the communications manager 820 in accordance with examples as described herein, the device 805 may support techniques for batch-wise collection of samples for K channels and offline processing of those samples to conserve power, reduce the RF scan time, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of batch-wise frequency scanning as described herein, or the processor 840 and the memory 830 may be otherwise configured to perform or support such operations.

Figure 9:
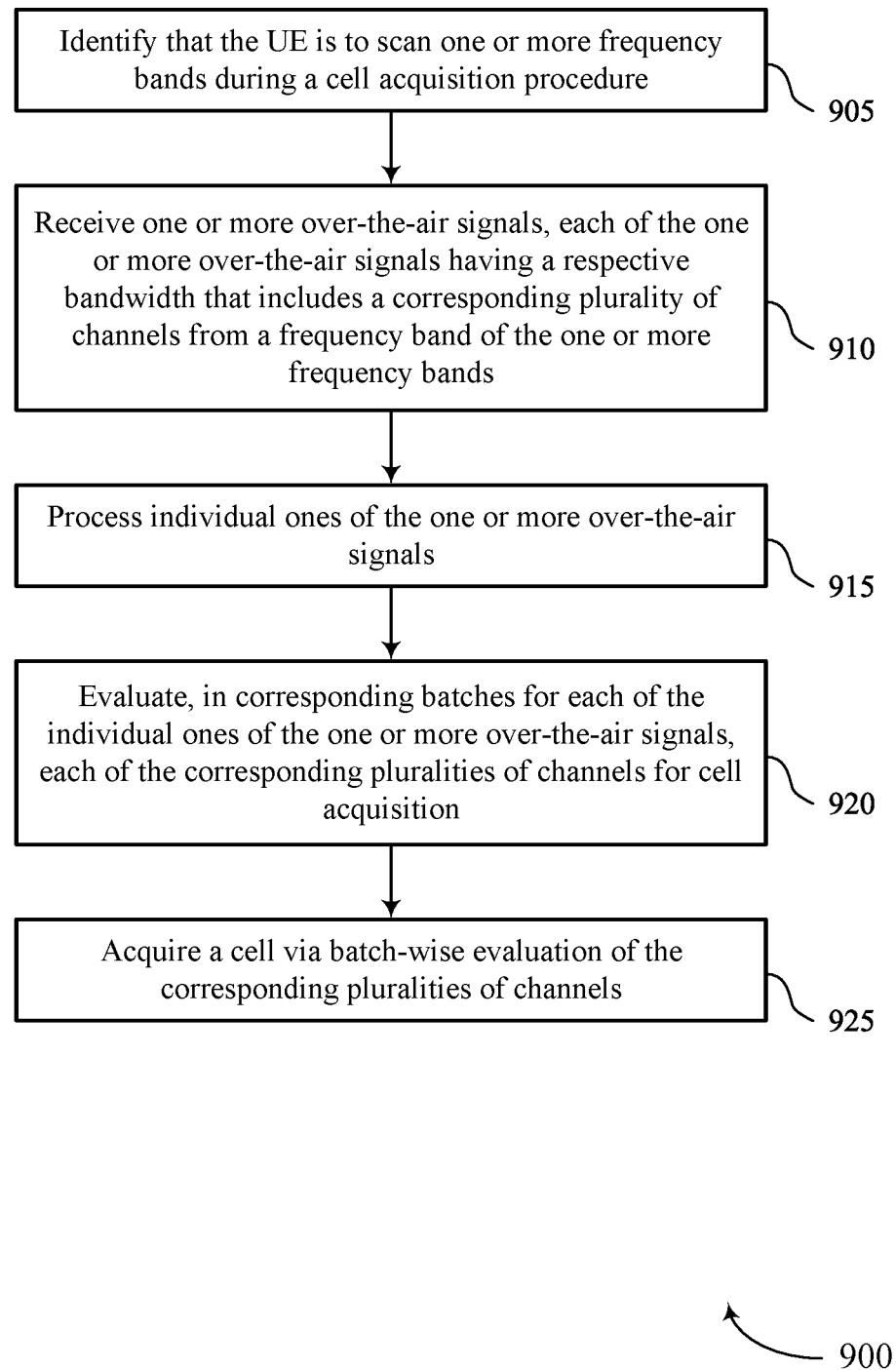
FIGS. 9 through 11 show flowcharts illustrating methods that support batch-wise frequency scanning in accordance with aspects of the present disclosure.

FIG. 9 shows a flowchart illustrating a method 900 that supports batch-wise frequency scanning in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include identifying that the UE is to scan one or more frequency bands during a cell acquisition procedure. The operations of 905 may be performed in accordance with examples as disclosed herein. In some examples, aspects of the operations of 905 may be performed by a scan manager 725 as described with reference to FIG. 7.

At 910, the method may include receiving one or more over-the-air signals, each of the one or more over-the-air signals having a respective bandwidth that includes a corresponding set of multiple channels from a frequency band of the one or more frequency bands. The operations of 910 may be performed in accordance with examples as disclosed herein. In some examples, aspects of the operations of 910 may be performed by a signal processing manager 730 as described with reference to FIG. 7.

At 915, the method may include processing individual ones of the one or more over-the-air signals. The operations of 915 may be performed in accordance with examples as disclosed herein. In some examples, aspects of the operations of 915 may be performed by a signal processing manager 730 as described with reference to FIG. 7.

At 920, the method may include evaluating, in corresponding batches for each of the individual ones of the one or more over-the-air signals, each of the corresponding pluralities of channels for cell acquisition. The operations of 920 may be performed in accordance with examples as disclosed herein. In some examples, aspects of the operations of 920 may be performed by an acquisition manager 735 as described with reference to FIG. 7.

At 925, the method may include acquiring a cell via batch-wise evaluation of the corresponding pluralities of channels. The operations of 925 may be performed in accordance with examples as disclosed herein. In some examples, aspects of the operations of 925 may be performed by a cell acquisition manager 740 as described with reference to FIG. 7.

Figure 10:
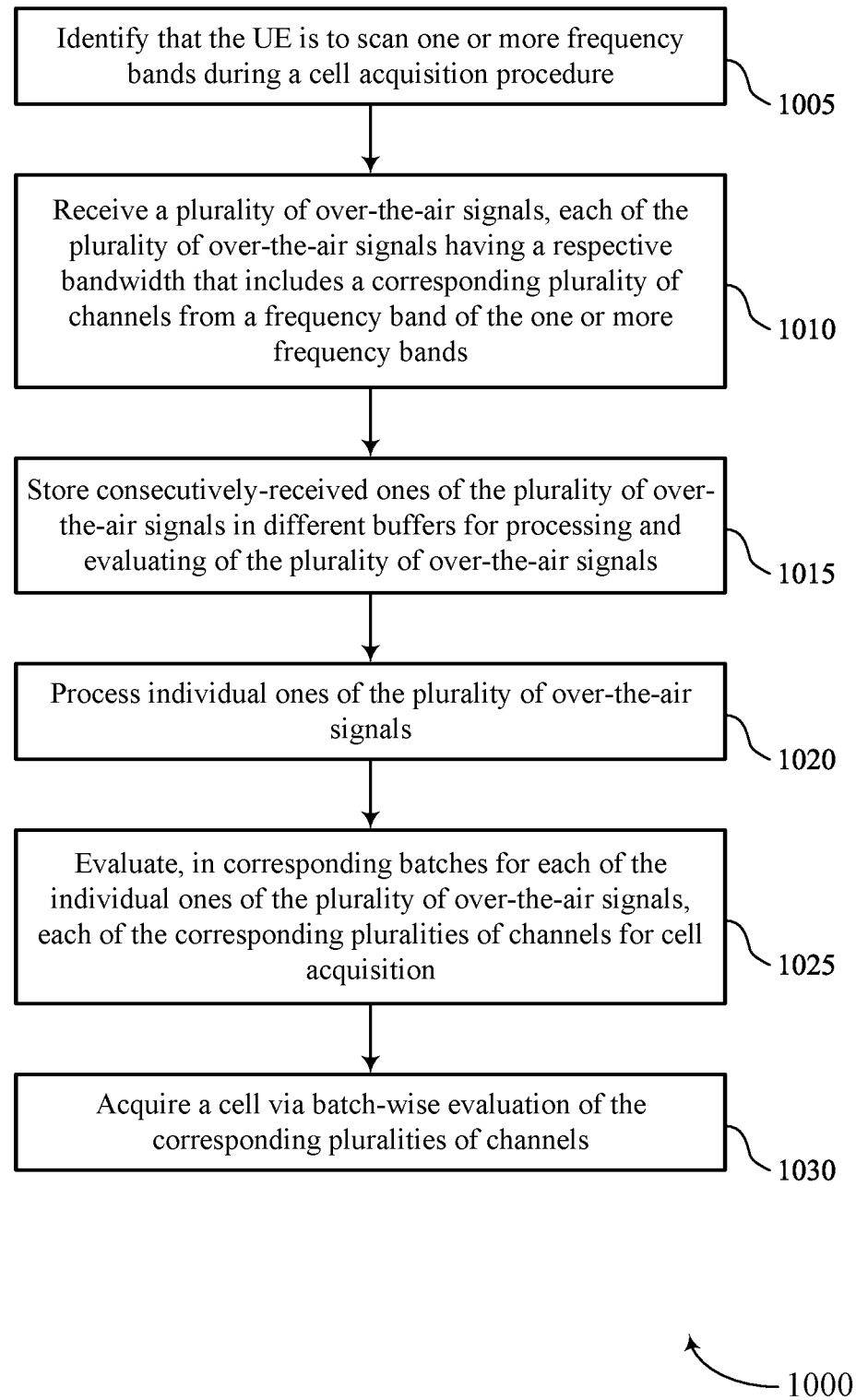

FIG. 10 shows a flowchart illustrating a method 1000 that supports batch-wise frequency scanning in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include identifying that the UE is to scan one or more frequency bands during a cell acquisition procedure. The operations of 1005 may be performed in accordance with examples as disclosed herein. In some examples, aspects of the operations of 1005 may be performed by a scan manager 725 as described with reference to FIG. 7.

At 1010, the method may include receiving a plurality of over-the-air signals, each of the plurality of over-the-air signals having a respective bandwidth that includes a corresponding set of multiple channels from a frequency band of the one or more frequency bands. The operations of 1010 may be performed in accordance with examples as disclosed herein. In some examples, aspects of the operations of 1010 may be performed by a signal processing manager 730 as described with reference to FIG. 7.

At 1015, the method may include storing consecutively-received ones of the plurality of over-the-air signals in different buffers for processing and evaluating of the plurality of over-the-air signals. The operations of 1015 may be performed in accordance with examples as disclosed herein. In some examples, aspects of the operations of 1015 may be performed by a buffer storage manager 745 as described with reference to FIG. 7.

At 1020, the method may include processing individual ones of the plurality of over-the-air signals. The operations of 1020 may be performed in accordance with examples as disclosed herein. In some examples, aspects of the operations of 1020 may be performed by a signal processing manager 730 as described with reference to FIG. 7.

At 1025, the method may include evaluating, in corresponding batches for each of the individual ones of the plurality of over-the-air signals, each of the corresponding pluralities of channels for cell acquisition. The operations of 1025 may be performed in accordance with examples as disclosed herein. In some examples, aspects of the operations of 1025 may be performed by an acquisition manager 735 as described with reference to FIG. 7.

At 1030, the method may include acquiring a cell via batch-wise evaluation of the corresponding pluralities of channels. The operations of 1030 may be performed in accordance with examples as disclosed herein. In some examples, aspects of the operations of 1030 may be performed by a cell acquisition manager 740 as described with reference to FIG. 7.

Figure 11:
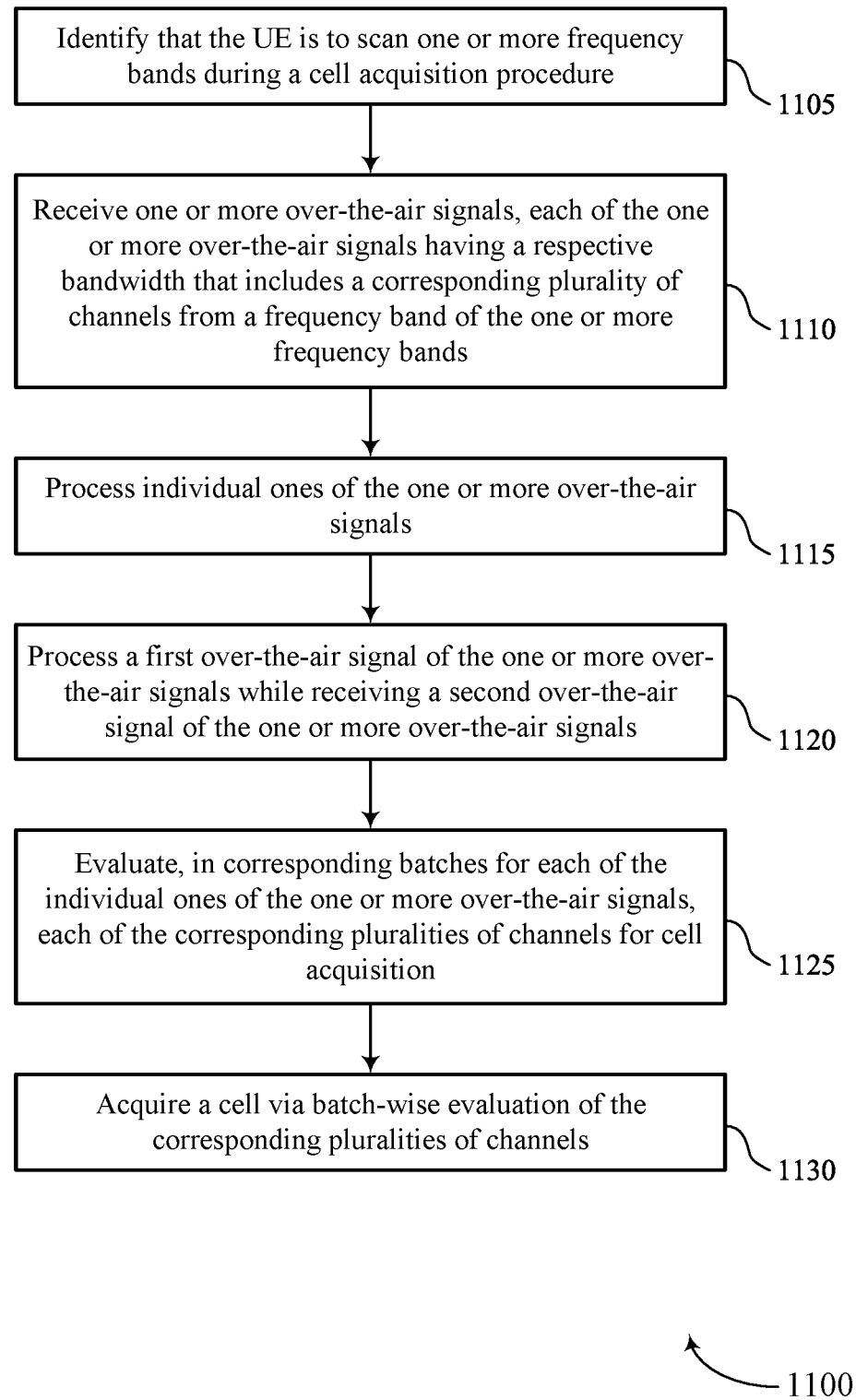

FIG. 11 shows a flowchart illustrating a method 1100 that supports batch-wise frequency scanning in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include identifying that the UE is to scan one or more frequency bands during a cell acquisition procedure. The operations of 1105 may be performed in accordance with examples as disclosed herein. In some examples, aspects of the operations of 1105 may be performed by a scan manager 725 as described with reference to FIG. 7.

At 1110, the method may include receiving one or more over-the-air signals, each of the one or more over-the-air signals having a respective bandwidth that includes a corresponding set of multiple channels from a frequency band of the one or more frequency bands. The operations of 1110 may be performed in accordance with examples as disclosed herein. In some examples, aspects of the operations of 1110 may be performed by a signal processing manager 730 as described with reference to FIG. 7.

At 1115, the method may include processing individual ones of the one or more over-the-air signals. The operations of 1115 may be performed in accordance with examples as disclosed herein. In some examples, aspects of the operations of 1115 may be performed by a signal processing manager 730 as described with reference to FIG. 7.

At 1120, the method may include processing a first over-the-air signal of the one or more over-the-air signals while receiving a second over-the-air signal of the one or more over-the-air signals. The operations of 1120 may be performed in accordance with examples as disclosed herein. In some examples, aspects of the operations of 1120 may be performed by a signal/processing manager 750 as described with reference to FIG. 7.

At 1125, the method may include evaluating, in corresponding batches for each of the individual ones of the one or more over-the-air signals, each of the corresponding pluralities of channels for cell acquisition. The operations of 1125 may be performed in accordance with examples as disclosed herein. In some examples, aspects of the operations of 1125 may be performed by an acquisition manager 735 as described with reference to FIG. 7.

At 1130, the method may include acquiring a cell via batch-wise evaluation of the corresponding pluralities of channels. The operations of 1130 may be performed in accordance with examples as disclosed herein. In some examples, aspects of the operations of 1130 may be performed by a cell acquisition manager 740 as described with reference to FIG. 7.

The following provides an overview of aspects of the present disclosure:

Aspect 1: A method for wireless communication at a UE, comprising: identifying that the UE is to scan one or more frequency bands during a cell acquisition procedure; receiving one or more over-the-air signals, each of the one or more over-the-air signals having a respective bandwidth that includes a corresponding plurality of channels from a frequency band of the one or more frequency bands; processing individual ones of the one or more over-the air signals; evaluating, in corresponding batches for each of the individual ones of the one or more over-the-air signals, each of the corresponding pluralities of channels for cell acquisition; and acquiring a cell via batch-wise evaluation of the corresponding pluralities of channels.

Aspect 2: The method of aspect 1, wherein receiving the one or more over-the-air signals comprises: storing consecutively-received ones of the one or more over-the-air signals in different buffers for processing and evaluating.

Aspect 3: The method of any of aspects 1 through 2, wherein processing the individual ones of the one or more over-the-air signals comprises: processing a first over-the-air signal of the one or more over-the-air signals while receiving a second over-the-air signal of the one or more over-the-air signals.

Aspect 4: The method of any of aspects 1 through 3, further comprising: reducing power to radio frequency components of the UE during at least a portion of the processing of the individual ones of the one or more over-the-air signals.

Aspect 5: The method of any of aspects 1 through 4, wherein evaluating each of the corresponding pluralities of channels for cell acquisition comprises: evaluating, as a batch, each of the corresponding pluralities of channels in parallel.

Aspect 6: The method of any of aspects 1 through 5, wherein evaluating each of the corresponding pluralities of channels for cell acquisition comprises: scanning for a narrowband primary synchronization signal in each of the corresponding pluralities of channels.

Aspect 7: The method of any of aspects 1 through 6, further comprising: completing a full frequency scan of each of the one or more frequency bands during the cell acquisition procedure.

Aspect 8: The method of any of aspects 1 through 7, further comprising: terminating the cell acquisition procedure without completing a full frequency scan of each of the one or more frequency bands based at least in part on a successful detection of a cell during the evaluating.

Aspect 9: The method of any of aspects 1 through 8, wherein evaluating each of the corresponding pluralities of channels for cell acquisition comprises: evaluating individual EARFCNs within a single over-the-air signal of the one or more over-the-air signals.

Aspect 10: The method of any of aspects 1 through 9, wherein the UE is a narrow-band Internet of Things device.

Aspect 11: An apparatus for wireless communication at a UE, comprising a processor; memory coupled with the processor; and instructions stored in the memory and executable by the processor to cause the apparatus to perform a method of any of aspects 1 through 10.

Aspect 12: An apparatus for wireless communication at a UE, comprising at least one means for performing a method of any of aspects 1 through 10.

Aspect 13: A non-transitory computer-readable medium storing code for wireless communication at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   identifying that the UE is to scan one or more frequency bands during a cell acquisition procedure;
   receiving one or more over-the-air signals, each of the one or more over-the-air signals having a respective bandwidth that includes corresponding pluralities of channels from a frequency band of the one or more frequency bands;
   storing consecutively-received individual ones of the one or more over-the-air signals in different buffers;
   processing, in corresponding batches based at least in part on the storing, individual ones of the one or more over-the-air signals, wherein the processing includes processing a first over-the-air signal of the one or more over-the-air signals while receiving a second over-the-air signal of the one or more over-the-air signals;
   evaluating, in the corresponding batches for each of the individual ones of the one or more over-the-air signals, each of the corresponding pluralities of channels for cell acquisition; and
   acquiring a cell via batch-wise evaluation of the corresponding pluralities of channels.

2. The method of claim 1, wherein receiving the one or more over-the-air signals comprises:
   receiving a plurality of over-the-air signals; and
   storing consecutively-received ones of the plurality of over-the-air signals in different buffers for processing and evaluating of the plurality of over-the-air signals.

3. The method of claim 1, further comprising:
   reducing power to radio frequency components of the UE during at least a portion of the processing of the individual ones of the one or more over-the-air signals.

4. The method of claim 1, wherein evaluating each of the corresponding pluralities of channels for cell acquisition comprises:
   evaluating, as a batch, each of the corresponding pluralities of channels in parallel.

5. The method of claim 1, wherein evaluating each of the corresponding pluralities of channels for cell acquisition comprises:
   scanning for a narrowband primary synchronization signal in each of the corresponding pluralities of channels.

6. The method of claim 1, further comprising:
   completing a full frequency scan of each of the one or more frequency bands during the cell acquisition procedure.

7. The method of claim 1, further comprising:
   terminating the cell acquisition procedure without completing a full frequency scan of each of the one or more frequency bands based at least in part on a successful detection of a cell during the evaluating.

8. The method of claim 1, wherein evaluating each of the corresponding pluralities of channels for cell acquisition comprises:
   evaluating individual evolved Universal Mobile Telecommunications System (UMTS) Terrestrial Radio Access (E-UTRA) Absolute Radio Frequency Channel Numbers (eARFCNs) within a single over-the-air signal of the one or more over-the-air signals.

9. The method of claim 1, wherein the UE is a narrowband Internet of Things device.

10. An apparatus for wireless communication at a user equipment (UE), comprising:
    at least one processor; and
    memory coupled with the at least one processor, wherein the at least one processor is configured to:
      identify that the UE is to scan one or more frequency bands during a cell acquisition procedure;
      receive one or more over-the-air signals, each of the one or more over-the-air signals having a respective bandwidth that includes corresponding pluralities of channels from a frequency band of the one or more frequency bands;
      store consecutively-received individual ones of the one or more over-the-air signals in different buffers;
      process, in corresponding batches based at least in part on the storing, individual ones of the one or more over-the-air signals, wherein the processing includes processing a first over-the-air signal of the one or more over-the-air signals while receiving a second over-the-air signal of the one or more over-the-air signals;
      evaluate, in the corresponding batches for each of the individual ones of the one or more over-the-air signals, each of the corresponding pluralities of channels for cell acquisition; and
      acquire a cell via batch-wise evaluation of the corresponding pluralities of channels.

11. The apparatus of claim 10, wherein, to receive the one or more over-the-air signals, the at least one processor is further configured to:
receive a plurality of over-the-air signals; and
store consecutively-received ones of the plurality of over-the-air signals in different buffers for processing and evaluating of the plurality of over-the-air signals.

12. The apparatus of claim 10, wherein the at least one processor is further configured to:
reduce power to radio frequency components of the UE during at least a portion of the processing of the individual ones of the one or more over-the-air signals.

13. The apparatus of claim 10, wherein, to evaluate each of the corresponding pluralities of channels for cell acquisition, the at least one processor is further configured to:
evaluate, as a batch, each of the corresponding pluralities of channels in parallel.

14. The apparatus of claim 10, wherein, to evaluate each of the corresponding pluralities of channels for cell acquisition, the at least one processor is further configured to:
scan for a narrowband primary synchronization signal in each of the corresponding pluralities of channels.

15. The apparatus of claim 10, wherein the at least one processor is further configured to:
complete a full frequency scan of each of the one or more frequency bands during the cell acquisition procedure.

16. The apparatus of claim 10, wherein the at least one processor is further configured to:
terminate the cell acquisition procedure without completing a full frequency scan of each of the one or more frequency bands based at least in part on a successful detection of a cell during the evaluating.

17. The apparatus of claim 10, wherein, to evaluate each of the corresponding pluralities of channels for cell acquisition, the at least one processor is further configured to:
evaluate individual evolved Universal Mobile Telecommunications System (UMTS) Terrestrial Radio Access (E-UTRA) Absolute Radio Frequency Channel Numbers (eARFCNs) within a single over-the-air signal of the one or more over-the-air signals.

18. The apparatus of claim 10, wherein the UE is a narrow-band Internet of Things device.

19. An apparatus for wireless communication at a user equipment (UE), comprising:
means for identifying that the UE is to scan one or more frequency bands during a cell acquisition procedure;
means for receiving one or more over-the-air signals, each of the one or more over-the-air signals having a respective bandwidth that includes corresponding pluralities of channels from a frequency band of the one or more frequency bands;
means for storing consecutively-received individual ones of the over-the-air signals in different buffers;
means for processing, in corresponding batches based at least in part on the storing, individual ones of the one or more over-the-air signals, wherein the processing includes processing a first over-the-air signal of the one or more over-the-air signals while receiving a second over-the-air signal of the one or more over-the-air signals;
means for evaluating, in the corresponding batches for each of the individual ones of the one or more over-the-air signals, each of the corresponding pluralities of channels for cell acquisition; and
means for acquiring a cell via batch-wise evaluation of the corresponding pluralities of channels.

20. A non-transitory computer-readable medium storing code for wireless communication at a user equipment (UE), the code comprising instructions executable by a processor to:
identify that the UE is to scan one or more frequency bands during a cell acquisition procedure;
receive one or more over-the-air signals, each of the one or more over-the-air signals having a respective bandwidth that includes corresponding pluralities of channels from a frequency band of the one or more frequency bands;
store consecutively-received individual ones of the one or more over-the-air signals in different buffers;
process, in corresponding batches based at least in part on the storing, individual ones of the one or more over-the-air signals, wherein the processing includes processing a first over-the-air signal of the one or more over-the-air signals while receiving a second over-the-air signal of the one or more over-the-air signals;
evaluate, in the corresponding batches for each of the individual ones of the one or more over-the-air signals, each of the corresponding pluralities of channels for cell acquisition; and
acquire a cell via batch-wise evaluation of the corresponding pluralities of channels.

21. The non-transitory computer-readable medium of claim 20, wherein the instructions to receive the one or more over-the-air signals are executable by the processor to:
receive a plurality of over-the-air signals; and
store consecutively-received ones of the plurality of over-the-air signals in different buffers for processing and evaluating of the plurality of over-the-air signals.

22. The non-transitory computer-readable medium of claim 20, wherein the instructions are further executable by the processor to:
reduce power to radio frequency components of the UE during at least a portion of the processing of the individual ones of the one or more over-the-air signals.

23. The non-transitory computer-readable medium of claim 20, wherein the instructions to evaluate each of the corresponding pluralities of channels for cell acquisition are executable by the processor to:
evaluate, as a batch, each of the corresponding pluralities of channels in parallel.

24. The non-transitory computer-readable medium of claim 20, wherein the instructions to evaluate each of the corresponding pluralities of channels for cell acquisition are executable by the processor to:
scan for a narrowband primary synchronization signal in each of the corresponding pluralities of channels.

25. The non-transitory computer-readable medium of claim 20, wherein the instructions are further executable by the processor to:
complete a full frequency scan of each of the one or more frequency bands during the cell acquisition procedure.

26. The non-transitory computer-readable medium of claim 20, wherein the instructions are further executable by the processor to:
terminate the cell acquisition procedure without completing a full frequency scan of each of the one or more frequency bands based at least in part on a successful detection of a cell during the evaluating.

27. The non-transitory computer-readable medium of claim 20, wherein the instructions to evaluate each of the corresponding pluralities of channels for cell acquisition are executable by the processor to:

evaluate individual evolved Universal Mobile Telecommunications System (UMTS) Terrestrial Radio Access (E-UTRA) Absolute Radio Frequency Channel Numbers (eARFCNs) within a single over-the-air signal of the one or more over-the-air signals.

* * * * *